(12) United States Patent
Wijnands et al.

(10) Patent No.: US 10,630,743 B2
(45) Date of Patent: Apr. 21, 2020

(54) UNICAST MEDIA REPLICATION FABRIC USING BIT INDEXED EXPLICIT REPLICATION

(71) Applicant: Cisco Technology, Inc., San Jose, CA (US)

(72) Inventors: Ijsbrand Wijnands, Leuven (BE); Thomas Kernen, Russin (CH); Gregory J. Shepherd, Eugene, OR (US); Neale D. R. Ranns, Basingstoke (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/581,806

(22) Filed: Apr. 28, 2017

(65) Prior Publication Data

US 2018/0091473 A1 Mar. 29, 2018

Related U.S. Application Data

(60) Provisional application No. 62/398,849, filed on Sep. 23, 2016.

(51) Int. Cl.
*H04L 29/06* (2006.01)
*H04L 29/12* (2006.01)

(52) U.S. Cl.
CPC ........ *H04L 65/4076* (2013.01); *H04L 61/103* (2013.01); *H04L 61/2069* (2013.01);
(Continued)

(58) Field of Classification Search
CPC ............. H04L 65/4076; H04L 12/4633; H04L 61/103; H04L 61/2069; H04L 61/6095;
(Continued)

(56) References Cited

U.S. PATENT DOCUMENTS

| 5,088,091 | A | 2/1992 | Schroeder |
| 5,138,615 | A | 8/1992 | Lamport ........................ 370/400 |

(Continued)

FOREIGN PATENT DOCUMENTS

| CN | 1754 353 | 3/2006 |
| CN | 1792065 A | 6/2006 |

(Continued)

OTHER PUBLICATIONS

Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).

(Continued)

*Primary Examiner* — Kibrom T Hailu
(74) *Attorney, Agent, or Firm* — Campbell Stephenson LLP

(57) ABSTRACT

Methods and network devices are disclosed for replication and switching of Internet Protocol (IP) packets in professional media networks. In one embodiment, a method includes encapsulating a unicast IP packet with a packet bit array and forwarding the encapsulated packet via a replication fabric within a network. In this embodiment, each receiver of a plurality of receivers reachable via the replication fabric is represented by a relative bit position in the packet bit array, a respective IP address is assigned to each receiver of the plurality of receivers, and the replication fabric is adapted to store disposition information mapping a relative bit position representing one or more of the plurality of receivers to IP addresses assigned to the one or more of the plurality of receivers. An embodiment of a network device includes a processor operably coupled to a network interface and adapted to perform steps of the method.

20 Claims, 13 Drawing Sheets

(52) U.S. Cl.
CPC ........ *H04L 61/6095* (2013.01); *H04L 65/607* (2013.01); *H04L 61/2007* (2013.01)

(58) Field of Classification Search
CPC .. H04L 65/607; H04L 61/2007; H04L 45/741
See application file for complete search history.

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| 6,130,881 A | 10/2000 | Stiller et al. | |
| 6,147,976 A | 11/2000 | Shand et al. | |
| 6,148,000 A | 11/2000 | Feldman | 370/394 |
| 6,240,188 B1 | 5/2001 | Dondeti | 380/284 |
| 6,615,336 B1 | 9/2003 | Chen | 370/351 |
| 6,771,673 B1 | 8/2004 | Baum | 370/535 |
| 6,778,532 B1 | 8/2004 | Akahane | 370/389 |
| 6,873,627 B1 | 3/2005 | Miller | |
| 7,111,101 B1 | 9/2006 | Bourke | 326/40 |
| 7,281,085 B1 | 10/2007 | Garg et al. | |
| 7,519,733 B1 | 4/2009 | Thubert | 709/232 |
| 7,551,599 B2 | 6/2009 | Levit | 370/254 |
| 7,719,995 B2 | 5/2010 | Luft | 370/252 |
| 7,925,778 B1 | 4/2011 | Wijnands | 370/389 |
| 8,320,374 B2 | 11/2012 | de Heer | 370/390 |
| 8,325,726 B2 | 12/2012 | Baban et al. | 370/390 |
| 8,670,146 B1 | 3/2014 | Couvering | |
| 8,774,179 B1 | 7/2014 | Gaggara | 370/389 |
| 8,787,400 B1 | 7/2014 | Barth | 370/419 |
| 8,830,826 B2 | 9/2014 | Chen | 370/228 |
| 8,848,728 B1 | 9/2014 | Revah | 370/386 |
| 8,880,869 B1 | 11/2014 | Shah | 713/151 |
| 8,890,903 B2 | 11/2014 | Russell et al. | |
| 8,942,256 B1 | 1/2015 | Barth | 370/255 |
| 9,065,766 B2 | 6/2015 | Matsuoka | |
| 9,288,067 B2 | 3/2016 | Farinacci et al. | 370/390 |
| 9,455,918 B1 | 9/2016 | Revah | |
| 2002/0126661 A1 | 9/2002 | Ngai | 370/380 |
| 2002/0191628 A1 | 12/2002 | Liu | 370/428 |
| 2003/0043802 A1 | 3/2003 | Yazaki | 370/389 |
| 2003/0048779 A1 | 3/2003 | Doherty et al. | |
| 2003/0088696 A1 | 5/2003 | McCanne | 709/238 |
| 2003/0142685 A1 | 7/2003 | Bare | 370/410 |
| 2003/0210695 A1 | 11/2003 | Henrion | 370/392 |
| 2004/0190526 A1 | 9/2004 | Kumar | |
| 2004/0190527 A1 | 9/2004 | Okura et al. | |
| 2004/0240442 A1 | 12/2004 | Grimminger | 370/389 |
| 2004/0264374 A1 | 12/2004 | Yu | 370/230 |
| 2005/0018693 A1 | 1/2005 | Dull | |
| 2005/0157724 A1 | 7/2005 | Montuno et al. | |
| 2005/0169270 A1 | 8/2005 | Mutou | 370/390 |
| 2005/0181807 A1 | 8/2005 | Dowling | |
| 2005/0232272 A1 | 10/2005 | Deng | 370/390 |
| 2006/0133298 A1 | 6/2006 | Ng | 370/254 |
| 2006/0182035 A1 | 8/2006 | Vasseur | 370/238 |
| 2006/0187817 A1 | 8/2006 | Charzinski | 370/216 |
| 2006/0280192 A1 | 12/2006 | Desanti | 370/409 |
| 2006/0291444 A1 | 12/2006 | Alvarez | 370/351 |
| 2007/0115968 A1 | 5/2007 | Brown | |
| 2007/0127474 A1 | 6/2007 | Mirtorabi et al. | 370/390 |
| 2007/0189291 A1 | 8/2007 | Tian | 370/390 |
| 2008/0069125 A1 | 3/2008 | Reed | 370/410 |
| 2008/0159285 A1 | 7/2008 | De Heer | 370/390 |
| 2008/0165783 A1 | 7/2008 | Desanti | 370/392 |
| 2008/0194240 A1 | 8/2008 | Dowling | 455/414.3 |
| 2008/0212465 A1 | 9/2008 | Yan | 370/225 |
| 2008/0240105 A1 | 10/2008 | Abdallah | |
| 2008/0316916 A1 | 12/2008 | Tazzari et al. | |
| 2009/0067348 A1 | 3/2009 | Vasseur | 370/256 |
| 2009/0185549 A1 | 7/2009 | Shon | 370/379 |
| 2009/0196289 A1 | 8/2009 | Shankar et al. | |
| 2009/0213735 A1 | 8/2009 | Check | 370/236 |
| 2009/0219817 A1 | 9/2009 | Carley | 370/235.1 |
| 2009/0225650 A1 | 9/2009 | Vasseur | |
| 2009/0310610 A1 | 12/2009 | Sandstrom | 370/394 |
| 2010/0046400 A1 | 2/2010 | Wu | |
| 2010/0046515 A1 | 2/2010 | Wong | 370/390 |
| 2010/0124225 A1 | 5/2010 | Fedyk | |
| 2010/0191911 A1 | 7/2010 | Heddes et al. | |
| 2011/0149973 A1 | 6/2011 | Rothenberg et al. | |
| 2011/0202761 A1 | 8/2011 | Sarela et al. | 716/163 |
| 2011/0228770 A1 | 9/2011 | Dholakia | 370/390 |
| 2011/0238816 A1 | 9/2011 | Vohra | |
| 2011/0274112 A1 | 11/2011 | Czaszar | 370/392 |
| 2011/0299531 A1 | 12/2011 | Yu | 370/392 |
| 2012/0075988 A1 | 3/2012 | Lu | 370/218 |
| 2012/0099591 A1 | 4/2012 | Kotha | 370/392 |
| 2012/0106560 A1 | 5/2012 | Gumaste | 370/401 |
| 2012/0198064 A1 | 8/2012 | Boutros | |
| 2012/0236857 A1 | 9/2012 | Manzella | 370/390 |
| 2012/0243539 A1 | 9/2012 | Keesara | 370/392 |
| 2013/0034097 A1 | 2/2013 | Dharmapurikar | 370/390 |
| 2013/0051376 A1 | 2/2013 | Hatashita | 370/338 |
| 2013/0107725 A1 | 5/2013 | Jeng | |
| 2013/0114595 A1 | 5/2013 | Mack-Crane | 370/390 |
| 2013/0114619 A1 | 5/2013 | Wakumoto | 370/406 |
| 2013/0136117 A1 | 5/2013 | Schrum, Jr. | 370/338 |
| 2013/0136123 A1 | 5/2013 | Ge et al. | |
| 2013/0170450 A1 | 7/2013 | Anchan | 370/329 |
| 2013/0195001 A1 | 8/2013 | Liu | |
| 2013/0201988 A1 | 8/2013 | Zhou | 370/390 |
| 2013/0308948 A1 | 11/2013 | Swinkels | 398/66 |
| 2013/0329728 A1 | 12/2013 | Ramesh | |
| 2013/0336315 A1 | 12/2013 | Guichard | 370/389 |
| 2013/0343384 A1 | 12/2013 | Shepherd | 370/390 |
| 2014/0010074 A1 | 1/2014 | Ye | |
| 2014/0010223 A1 | 1/2014 | Wang | 370/338 |
| 2014/0043964 A1 | 2/2014 | Gabriel | 370/229 |
| 2014/0064081 A1 | 3/2014 | Morandin | |
| 2014/0098813 A1 | 4/2014 | Mishra | 370/390 |
| 2014/0119191 A1 | 5/2014 | Onoue | 370/236 |
| 2014/0126575 A1 | 5/2014 | Janneteau | |
| 2014/0160925 A1 | 6/2014 | Xu | 370/235 |
| 2014/0189174 A1 | 7/2014 | Ajanovic | 710/106 |
| 2014/0362846 A1 | 12/2014 | Li | |
| 2014/0369356 A1 | 12/2014 | Bryant et al. | |
| 2015/0003458 A1 | 1/2015 | Li | 370/392 |
| 2015/0009823 A1 | 1/2015 | Ganga | 370/235 |
| 2015/0016469 A1* | 1/2015 | Ganichev | H04L 49/90 370/429 |
| 2015/0023328 A1 | 1/2015 | Thubert et al. | 370/336 |
| 2015/0049760 A1 | 2/2015 | Xu | 370/390 |
| 2015/0078377 A1 | 3/2015 | Wijnands et al. | 370/390 |
| 2015/0078378 A1 | 3/2015 | Wijnands et al. | 370/390 |
| 2015/0078379 A1 | 3/2015 | Wijnands et al. | 370/390 |
| 2015/0078380 A1 | 3/2015 | Wijnands et al. | 370/390 |
| 2015/0081941 A1 | 3/2015 | Brown | 710/116 |
| 2015/0085635 A1 | 3/2015 | Wijnands et al. | 370/216 |
| 2015/0092546 A1 | 4/2015 | Baratam | 370/230 |
| 2015/0131658 A1 | 5/2015 | Wijnands et al. | 370/390 |
| 2015/0131659 A1 | 5/2015 | Wijnands et al. | 370/390 |
| 2015/0131660 A1 | 5/2015 | Shepherd et al. | 370/390 |
| 2015/0138961 A1 | 5/2015 | Wijnands et al. | 370/228 |
| 2015/0139228 A1 | 5/2015 | Wijnands et al. | 370/390 |
| 2015/0172190 A1 | 6/2015 | Song | |
| 2015/0181309 A1 | 6/2015 | Wijnands et al. | 725/109 |
| 2015/0249672 A1 | 9/2015 | Kozat et al. | |
| 2015/0319086 A1 | 11/2015 | Tripathi | |
| 2015/0334006 A1 | 11/2015 | Shao | 370/225 |
| 2016/0087890 A1 | 3/2016 | Przygienda | |
| 2016/0119159 A1* | 4/2016 | Zhao | H04L 12/1854 370/390 |
| 2016/0127142 A1* | 5/2016 | Tian | H04L 12/1886 370/390 |
| 2016/0134518 A1* | 5/2016 | Callon | H04L 45/24 370/390 |
| 2016/0134535 A1 | 5/2016 | Callon | |
| 2016/0142248 A1 | 5/2016 | Thubert et al. | 370/372 |
| 2016/0182353 A1 | 6/2016 | Garcia-Luna-Aceves | 709/241 |
| 2016/0191372 A1* | 6/2016 | Zhang | H04L 45/16 370/390 |
| 2016/0205588 A1 | 7/2016 | Liu | 370/392 |
| 2016/0218961 A1 | 7/2016 | Lindem | 370/389 |
| 2016/0226725 A1* | 8/2016 | Iizuka | H04L 43/022 |

(56) References Cited

U.S. PATENT DOCUMENTS

| | | | |
|---|---|---|---|
| 2016/0254987 A1 | 9/2016 | Eckert et al. | 370/390 |
| 2016/0254988 A1 | 9/2016 | Eckert et al. | 370/390 |
| 2016/0254991 A1* | 9/2016 | Eckert | H04L 12/4633 370/225 |
| 2016/0344616 A1 | 11/2016 | Roch | |
| 2017/0012880 A1 | 1/2017 | Yang | |
| 2017/0099232 A1 | 4/2017 | Shepherd | 370/390 |
| 2017/0126416 A1 | 5/2017 | McCormick | |
| 2017/0142006 A1 | 5/2017 | Wijnands et al. | 370/390 |
| 2017/0302566 A1 | 10/2017 | Zhang | |
| 2018/0102965 A1* | 4/2018 | Hari | H04L 45/16 |
| 2018/0205565 A1 | 7/2018 | Wijnands et al. | |
| 2018/0205636 A1* | 7/2018 | Hu | H04L 45/16 |
| 2018/0278470 A1 | 9/2018 | Wijnands et al. | |
| 2018/0309664 A1* | 10/2018 | Balasubramanian | H04L 45/38 |
| 2019/0014034 A1* | 1/2019 | Allan | H04L 45/16 |
| 2019/0075041 A1 | 3/2019 | Wang | |
| 2019/0116114 A1 | 4/2019 | Chen | |
| 2019/0356500 A1 | 11/2019 | Wijnands et al. | |

FOREIGN PATENT DOCUMENTS

| | | | |
|---|---|---|---|
| CN | 101242413 A | 8/2008 | |
| CN | 101385 275 | 3/2009 | H04L 12/18 |
| CN | 101572667 | 11/2009 | H04L 12/56 |
| CN | 101689172 A | 3/2010 | |
| CN | 102025538 | 4/2011 | H04L 12/56 |
| CN | 102577 238 | 7/2012 | H04L 12/18 |
| WO | WO 2007/095331 | 8/2007 | 370/390 |

OTHER PUBLICATIONS

Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).

Wang, Xiaorong et al.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).

Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.

Artel Video Systems, White Paper; "The Broadcaster's Guide to SMPTE 2022: Applications in Video Contribution and Distribution," Oct. 2014, pp. 1-7.

Bates, T. et al.; "Multiprotocol Extensions for BGP-4," Network Working Group, Request for Comments 4760, Jan. 2007, pp. 1-12.

Boivie, Rick, and N. Feldman, IBM Watson Research Center; "Small Group Multicast," draft-boivie-sgm-02.txt, Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper, "Diffserv—The Scalable End-To-End Quality of Service Model," Aug. 2005, pp. 1-18.

Das, Kaushik, "IPv6 Header Deconstructed"; http://www.ipv6.com/articles/general/IPv6-Header.htm; Apr. 18, 2008; 2 pages.

Deering, S., Cisco Systems, Inc. and R. Hinden, Nokia;"Internet Protocol, Version 6 (IPv6)," Network Working Group, Request for Comments 2460, Dec. 1998, pp. 1-39.

Eckert, T., "Traffic Engineering for Bit Index Explicit Replication BIER-TE, draft-eckert-bier-te-arch-00," Network Working Group, Internet-Draft, Mar. 5, 2015, pp. 1-21.

Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc.; "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00," Network Working Group, Internet-Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Li, Tony et al., "IGP Requirements for Traffic Engineering With MPLS, draft-li-mpls-igp-te-00.txt," Network Working Group, Internet-Draft, Feb. 1999, pp. 1-6.

Microsoft, "IPv6 Addressing (TechRef)"; Apr. 3, 2011; https://technet.microsoft.com/en-us/library/dd392266(v=ws.10).aspx; pp. 1-30.

Moy, J., Ascend Communications, Inc., "OSPF Version 2," Network Working Group, Request for Comments 2328, Apr. 1998, pp. 1-244.

Przygienda, T. et al., "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

Psenak, P. et al., Cisco Systems; "OSPF Extensions for BIER, draft-psenak-ospf-bier-extensions-01," OSPF, Internet-Draft, Oct. 24, 2014, pp. 1-8.

Psenak, P. et al., "OSPF Extensions for Segment Routing, draft-psenak-ospf-segment-routing-extension-05," Open Shortest Path First IGP, Internet-Draft, Jun. 2014, pp. 1-33.

Rekhter, Ed. Y. et al., "A Border Gateway Protocol 4 (BGP-4)," Network Working Group, Request for Comments 4271, Jan. 2006, pp. 1-104.

Rosen, Ed. E. et al., "Multicast VPN Using BIER, draft-rosen-l3vpn-mvpn-bier-01," Internet Engineering Task Force, Internet-Draft, Oct. 16, 2014, pp. 1-9.

Schulzrinne, H. et al., "RTP: A Transport Protocol for Real-Time Applications," Network Working Group, Request for Comments 3550, Jul. 2003, pp. 1-89.

Shen, Naiming et al., "Calculating IGP Routes Over Traffic Engineering Tunnels, draft-ietf-rtgwg-igp-shortcut-01.txt," Network Working Group, Internet-Draft, May 2004, pp. 1-7.

Shen, N et al., "Calculating Interior Gateway Protocol (IGP) Routes Over Traffic Engineering Tunnels," Network Working Group, Request for Comments 3906, Oct. 2004, pp. 1-8.

SMPTE, "Beyond the Digital Conversion, The Integration of Information Technology and Professional Media, The Convergence of 2 Industries—The Adoption of Information Technology by the Professional Media Industry; Report of the SMPTE Study Group on Media Production System Network Architecture," Mar. 31, 2014, © 2014 by the Society of Motion Picture and Television Engineers, Inc. (SMPTE), pp. 1-65.

SMPTE, "Transport of High Bit Rate Media Signals Over IP Networks (HBRMT)," ST 2022-6:2012, © 2015 by the Society of Motion Picture and Television Engineers, Inc. (SMPTE), p. 1.

(56) References Cited

OTHER PUBLICATIONS

SMPTE, "Definition of Vertical Interval Switching Point for Synchronous Video Switching," RP 168:2009, © 2015 by the Society of Motion Picture and Television Engineers, Inc. (SMPTE), p. 1.

Whitcomb, Leigh, "Real-Time Professional Broadcast Signals Over IP Networks," Harris Corporation, Technology Conference, Apr. 2011, pp. 1-60.

Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft, Oct. 7, 2011, pp. 1-13.

Wijnands, Ijsbrand, Cisco Systems, Inc., "Bit Index Explicit Replication using MPLS Encapsulation, draft-wijnands-mpls-bmf-encapsulation-00," Internet-Draft, Feb. 2014, pp. 1-9.

Wijnands, Ijsbrand, et al., "Multicast Using Bit Index Explicit Replication, draft-wijnands-bier-architecture-01," Internet Engineering Task Force, Internet-Draft, Oct. 16, 2014, pp. 1-24.

Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.

Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.

Xu, X. et al., "BIER Encapsulation, draft-xu-bier-encapsulation-00," Network Working Group, Internet-Draft, Sep. 30, 2014, pp. 1-6.

Xu, X. et al., "BIER Encapsulation, draft-xu-bier-encapsulation-01," Network Working Group, Internet-Draft, Oct. 20, 2014, pp. 1-6.

Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].

Wijnands, Ijsbrand et al., "Bit Indexed Explixit Replication Using Internet Protocol Version 6"; U.S. Appl. No. 15/919,522, filed Mar. 13, 2018 consisting of Specification, Claims, Abstract, and Drawings (49 pages).

Eckert, Toerless et al., "Traffic Engineering for Bit Indexed Explicit Replication"; U.S. Appl. No. 16/457,339 filed Jun. 28, 2019; consisting of Specification, Claims, Abstract, and Drawings (88 pages).

Wang, Xiaorong et al., "Multicast Traffic Steering Using Tree Identity in Bit Indexed Explicit Replication (BIER)"; U.S. Appl. No. 16/557,065 filed Aug. 30, 2019; consisting of Specification, Claims, Abstract, and Drawings (96 pages).

Wijnands, Isjbrand et al., "Overlay Signaling for Bit Indexed Explicit Replication"; U.S. Appl. No. 16/654,078 filed Oct. 16, 2019; consisting of Specification, Claims, Abstract, and Drawings (53 pages).

Wijnands, Isjbrand et al., "Bit Indexed Explicit Replication"; U.S. Appl. No. 16/669,653 filed Oct. 31, 2019; consisting of Specification, Claims, Abstract, and Drawings (49 pages).

\* cited by examiner

| Receiver | BP | IP Addr. |
|---|---|---|
| R1 | 1 | 192.168.1.1 |
| R2 | 1 | 192.168.1.2 |
| R3 | 2 | 192.168.1.3 |
| R4 | 3 | 192.168.2.1 |
| R5 | 4 | 192.168.3.1 |

| BIER Imposition Table B 420 | |
|---|---|
| IP flow | Packet bit array |
| S1, X | 1101 |

| BIER Disposition Table B 430 | |
|---|---|
| BP | IP dest. |
| 4 | 192.168.3.1 |

| BIER Disposition Table C 440 | |
|---|---|
| BP | IP dest. |
| 3 | 192.168.2.1 |

| BIER Disposition Table D 450 | |
|---|---|
| BP | IP dest. |
| 1 | 192.168.1.1 |
| 1 | 192.168.1.2 |
| 2 | 192.168.1.3 |

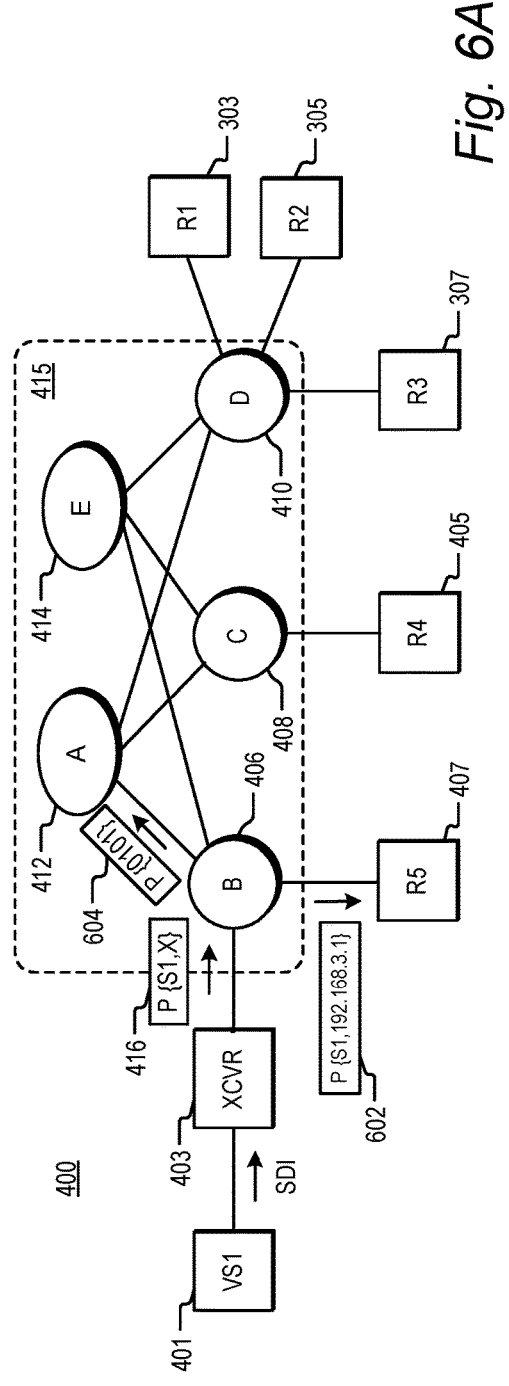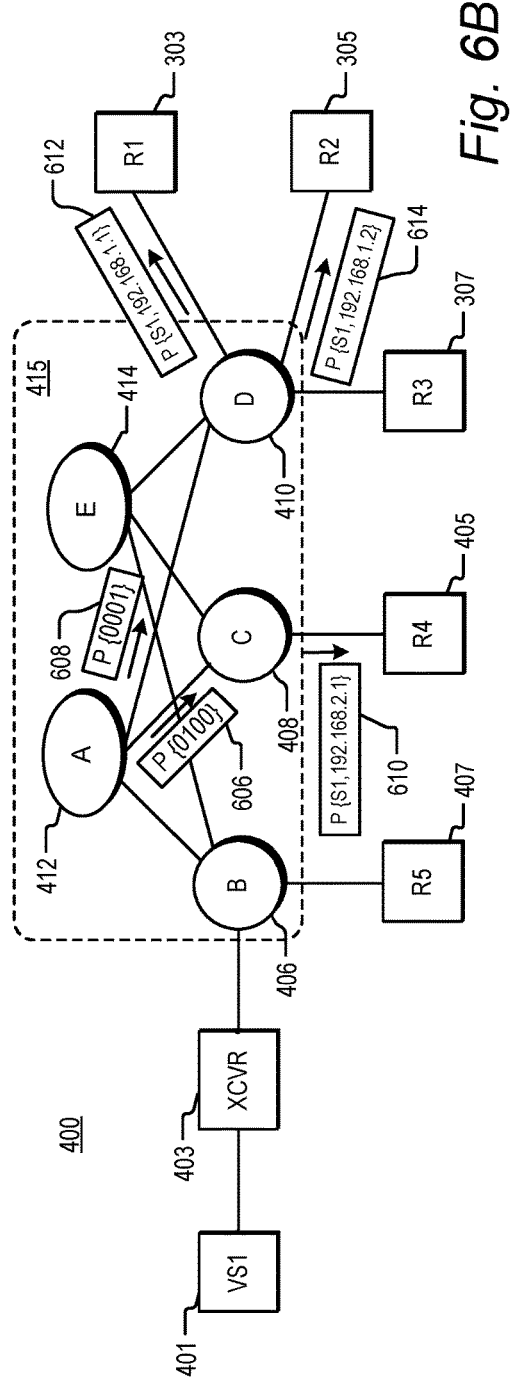

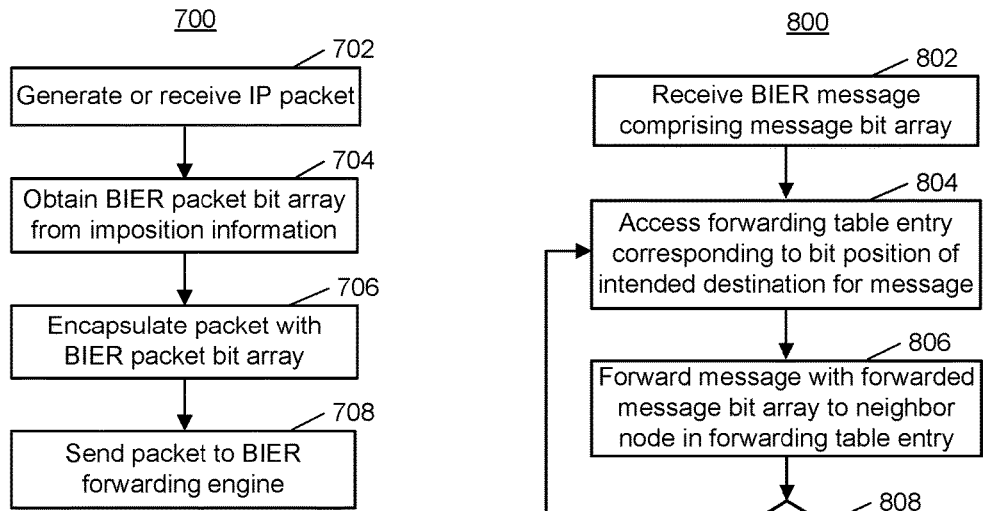
Fig. 7
Fig. 8A
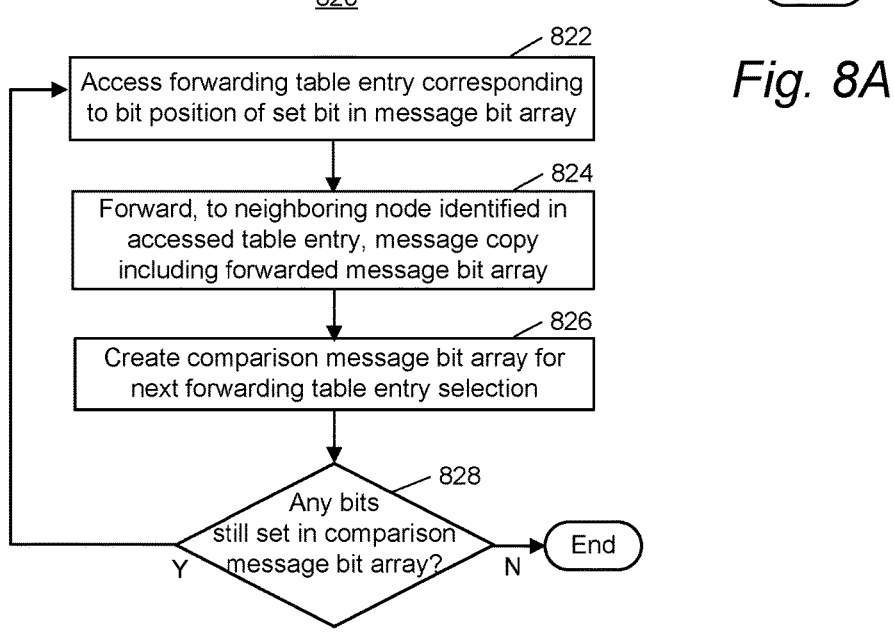
Fig. 8B

UNICAST MEDIA REPLICATION FABRIC USING BIT INDEXED EXPLICIT REPLICATION

RELATED APPLICATIONS

This application claims the domestic benefit under Title 35, Section 119(e) of the United States Code of U.S. Provisional Patent Application No. 62/398,849, entitled "Unicast Media Replication Fabric Using Bit Indexed Explicit Replication," filed Sep. 23, 2016, which application is hereby incorporated by reference in its entirety and for all purposes as if completely and fully set forth herein.

TECHNICAL FIELD

This disclosure relates generally to network communications and more particularly to transmission of professional media content over information networks.

BACKGROUND

Network nodes forward data. Network nodes may take the form of one or more routers, one or more bridges, one or more switches, one or more servers, or any other suitable communications processing device. The data is commonly formatted as messages and forwarded using forwarding tables. A message is a formatted unit of data that typically contains control information and payload data. Control information may include information that identifies sources and destinations, such as addresses, error detection codes like checksums, sequencing information, etc. Control information is typically found in message headers and trailers. Payload data is typically located between the message headers and trailers. Depending on factors such as the network level and network protocol used, a message may be formatted and/or referred to as one of various specific types such as packets, datagrams, segments, or frames.

Operation of routing mechanisms within a network can be described in terms of a "control plane" and a "data plane." The data plane, also referred to as the "forwarding plane," does the actual forwarding of messages coming into a node. Data plane decisions may involve accessing a forwarding table that relates the appropriate message identifier to the specific network interface, or egress interface, the message should be sent to in order to send it in the right direction. Generating such a forwarding table, based on a map, database, or other information reflecting the topology of the network, is a function of the control plane.

The processes involved in forwarding messages in networks may vary depending on the forwarding configuration used. Overall forwarding configurations include unicast, broadcast, and multicast forwarding. Unicast is a method of point-to-point communication most often used when a particular node (known as a source) has instructions to send data to another particular node (known as a receiver) and is not concerned with sending the data to multiple receivers. Broadcast is method used when a source has instructions to send data to all receivers in a domain, and multicast allows a source to send data to a group of receivers in a domain while preventing the data from being sent to other receivers in the domain.

Multicast is a preferred method of data forwarding for many popular applications, such as streaming media distribution. One reason for this is that multicast is a bandwidth-conserving technology that allows delivery of data to multiple receivers while avoiding transmission of multiple copies of the same message over the same network link. However, in traditional multicast systems, a relatively large amount of control plane information is used. Setting up and maintaining this control information has a tendency to become complex and costly in terms of computing resources, and can become a major limiting factor in overall network performance.

A professional media network (PMN) is used in the production, contribution, and distribution of high-quality audio and video content. For example, television presentations of live sporting events are distributed to millions of viewers around the world. Standards and technology related to how the content is formatted and transmitted between the various elements related to production, contribution, and distribution have been developing over the past decades. The standards and technology are designed to accommodate the types of data relevant to audio and video content and particular requirements of the data. For example, there are numerous requirements related to the timing of transmission and reception of signals related to particular content sources, and of transitions between such signals. Various content transmission infrastructures exist. Many such infrastructures utilize serial data transmission.

Technology for transmitting information in packet-based systems and networks has also been developing over the past decades. This is referred to as Information Technology (IT). IT networks have become prevalent in many aspects of modern life. Many IT networks use Internet Protocol (IP) for packet routing and switching. IP-based systems form an IP-based infrastructure for transmitting information.

The professional media industry is increasingly interested in using IT networks for transmission of its audio and video content. However, due to the nature of professional signals, and the requirements for handling those signals, implementing some of the capabilities available in IT networks presents challenges.

BRIEF DESCRIPTION OF THE DRAWINGS

The present disclosure may be better understood, and its numerous objects, features and advantages made apparent to those skilled in the art, by referencing the accompanying drawings.

FIGS. 6A and 6B illustrate an example of packet forwarding through the network of FIG. 4A.

FIG. 7 is a flow chart illustrating an example of a method performed at a node of a network described herein.

FIG. 8A is a flow chart illustrating an example of a method performed at a node of a network described herein.

FIG. 8B is a flow chart illustrating an example of a variation of the method of FIG. 8A.

DETAILED DESCRIPTION

Overview

Figure 1:
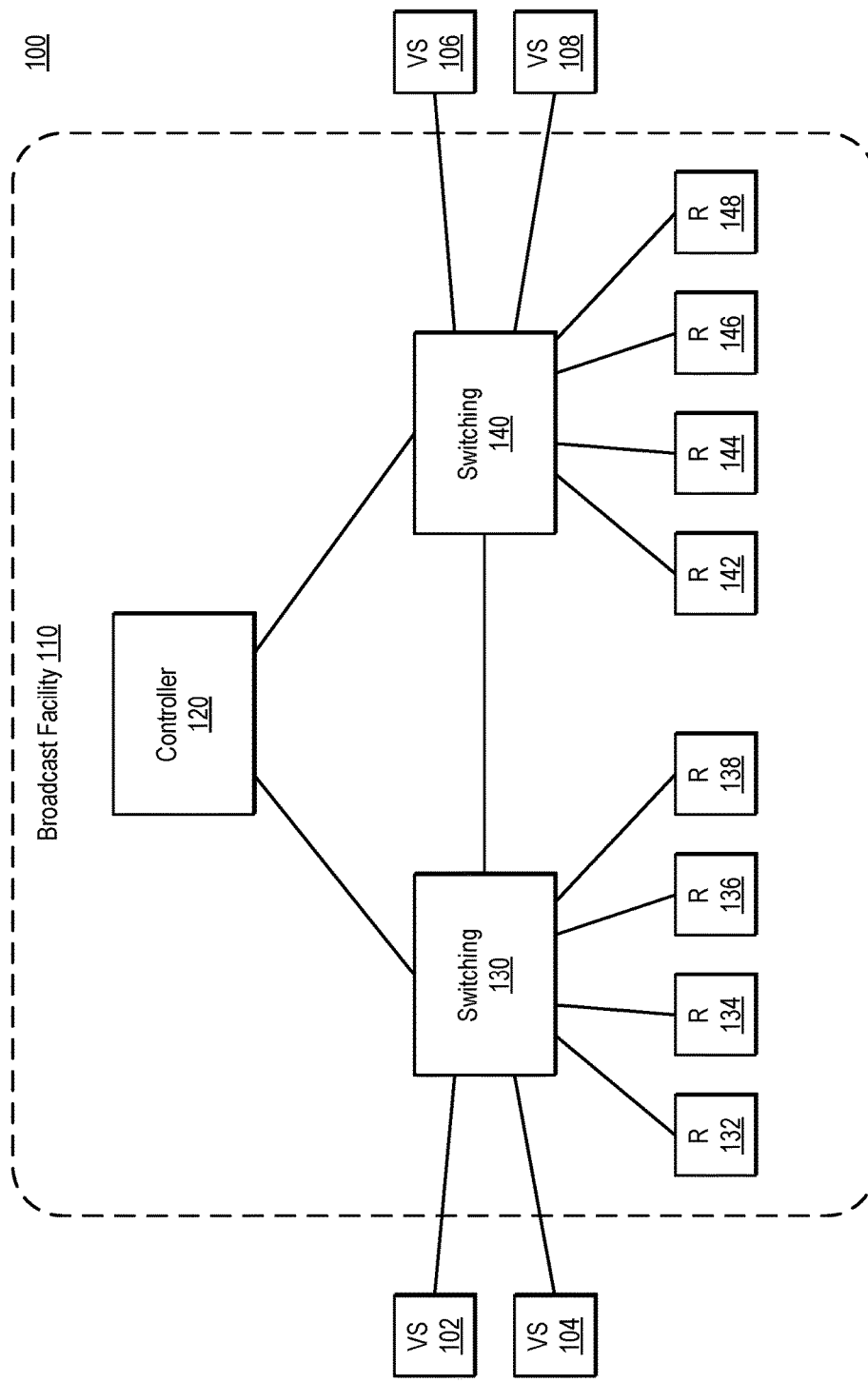
FIG. 1 is a simplified block diagram illustrating certain components of an example professional media network.

Methods and network devices are disclosed for replication and switching of Internet Protocol (IP) packets in professional media networks. In one embodiment, a method includes encapsulating a unicast IP packet with a packet bit array and forwarding the encapsulated packet via a replication fabric within a network. In this embodiment, each receiver of a plurality of receivers reachable via the replication fabric is represented by a relative bit position in the packet bit array, a respective IP address is assigned to each receiver of the plurality of receivers, and the replication fabric is adapted to store disposition information mapping a relative bit position representing one or more of the plurality of receivers to IP addresses assigned to the one or more of the plurality of receivers.

Professional Media Networks

Various systems exist for handling high-quality video and audio content. A Professional Media Network is one type of system, or collection of systems, that can be used for the production, contribution, and distribution of such content. In PMNs, content is often captured in one or more locations and processed. This is known as production or remote production and commonly involves recording content using one or more cameras and/or microphones.

The raw or produced content is then transmitted to another location or locations. This is known as contribution. Additional types of processing that are still part of the production process can be performed at these locations. Content processing in PMNs is commonly performed at a broadcast facility that includes a central connection hub or controller, such as a mixing board or switch, which provides physical connections between sources of content and a number of receivers. Content from various sources can be merged into a continuous stream and provided to potentially numerous receivers, based on control signals generated by a controller. The content may be provided in a live streaming format, via file transfer, or as static images. Switching between content sources and modifying the selection of receivers that receive the stream is extremely time-dependent. If these transitions do not occur on very specific boundaries or time intervals, video and audio distortions or discontinuities can result.

The content is then transmitted to still another location for distribution to consumers. Often the content is distributed live, or in real-time, although the content can also be recorded and stored for later playback.

Transmission between locations can be performed using IT networks and/or traditional PMNs. Eventually, the content is likely intended to be presented to viewers. If content is not properly handled, viewers can discern errors, such as delays, blank screens, momentary glitches, pops, and the like. Therefore, very strict procedures for error detection and correction, synchronization, and signal switching are adhered to in PMNs. One way to facilitate signal synchronization in PMNs is to provide each component of the PMN an external time reference, such as an analog reference signal. The components derive their timing from the reference signal. Propagation of the reference signal to each element of the PMN involves installing and maintaining a complete infrastructure just for the reference signal. Doing so is commonly extensive, expensive, inflexible, and not impervious to failure.

FIG. 1 shows an example PMN 100. The elements of PMN 100 capture, produce, and distribute content, such as audio content and/or video content. As used herein, video content, or simply video, includes digital video made up of video luminance and color-difference values. Video can also include, for example, vertical ancillary data, horizontal ancillary data, metadata, time code information, closed captions, graphics, test signals, content ratings, quality data, and the like. Additional video elements can include live camera signals, prerecorded material from video tape recorders and/or media servers, graphics, remote feeds, images from a still storage device, outputs of digital video effects units, and the like. Audio content, or simply audio, can include, for example, live studio microphones, prerecorded jingles, bridges from audio servers or audio recording devices, audio from the video recorders or remote sites, outputs of audio effects equipment, telephone interfaces, and the like. All of the above are referred to collectively herein, for the sake of simplicity, as video, or video content. Video can be standard definition, high definition, ultra high definition, or any other resolution or format, and can be compressed or uncompressed. In addition to video content, PMN 100 also transmits control content among the elements of PMN 100. Control traffic can be used to access state, manipulate state, and perform action on elements of PMN 100. Control traffic is typically used to deliver deterministic and low latency performance, and typically includes small, low bandwidth messages.

PMN 100 includes sources 102, 104, 106 and 108 and a broadcast facility 110. Sources 102 through 108 can be implemented as, for example, one or more cameras, microphones, or any other equipment capable of capturing audio and/or video content, and transmitting that content to other elements of PMN 100. For example, multiple cameras and microphones are often used to cover a live sports program. Signals (e.g., audio and video) from these sources are transmitted to switching elements in broadcast facility 110 to produce a finished program in real time. Though shown as being external to broadcast facility 110, one or more of sources 102 through 108 can in some embodiments be included within broadcast facility 110.

Broadcast facility 110 includes a controller 120, switching elements 130 and 140, and receivers 132 through 138 and 142 through 148. Broadcast facility 110 can be implemented, for example, as a television studio, production control room, master control room, or remote broadcast facility, such as an Outdoor Broadcast (OB) truck. Broadcast facility 110 can include numerous individual elements, such as video and audio monitors at numerous work stations staffed, for example, by directors, producers, and the like, referred to herein as operators. Some or all of the elements in broadcast facility 110 are synchronized to show the same moment in time in the audio and video in a continuous stream at a constant rate. For example, several operators can collaborate at their individual workstations on such video processing tasks as color correction, audio and video effects production, and the like. In an embodiment, the monitors on which these tasks are performed are identical in terms of time and video quality.

Controller 120 is an example of a central controlling authority used, for example, by an operator, to control what content is provided to which receivers, and when that content is provided to the receivers. Since multiple elements are often involved in a video processing task, control of these devices is important and timing of control commands is extremely time sensitive. In one embodiment, controller 120 is implemented as a video switch control console and/or one or more mixing boards or stations. Controller 120, in response to operator input, or automatically, for example, in response to pre-configured instructions or routines, sends control commands to switching elements 130 and 140, indicating what content, such as content received from one or more sources 102 through 108, is provided to which receivers, such as receivers 132 to 138 and 142 to 148, and when the content is provided. Since video production often involves switching signals from different sources to different receivers, these transitions are timed to occur, for example, at the start of a video frame or at the end of a video frame. In an embodiment, the elements of broadcast facility 110 have knowledge of the frame boundaries in a video stream so that the switches can occur at specific frame boundaries.

Switching elements 130 and 140 receive control commands from controller 120, and in response to those control commands, transmit content, such as content received from sources 102 through 108, to one or more of receivers 132 to 138 and 142 to 148, at the time specified by controller 120. Switching elements 130 and 140 are implemented as, for example, one or more network switching elements, such as one or more switches and/or routers.

Content can be transferred between the elements of professional media network 100 using one or more proprietary standards, such as Serial Digital Interface (SDI) developed by the Society of Motion Picture and Television Engineers (SMPTE). Alternatively, or in addition, content can be transferred using IT networking technology, such as Internet Protocol (IP).

PMNs and Information Technology Networks

Information technology (IT) networks transmit information in messages such as packets. As used herein, transmission refers to the transfer of data, e.g., audio and video content, between points (e.g., network nodes and/or video production and distribution devices) using some medium, such as copper wire, fiber optic cable, wireless communication channels, and the like. Transmission also includes various switching and routing operations involved in relaying the data between the points. In many traditional video and audio content infrastructures, content is serially transmitted in sequence. In such infrastructures, a failure may involve a loss as small as a single bit, which is tolerable. By contrast, packets in IT networks may be sent out of order, and then sequenced at a destination. The loss of a packet commonly represents the loss of a significant amount of data.

Modern PMNs incorporate efforts to transition traditional video and audio content infrastructures to IT networks. For example, many content providers are migrating from Serial Digital Interface (SDI) switches to IP switches. This involves effective transmission of audio and video content in packets, regardless of the mechanisms used to capture the audio and video content, such as sampling and frame rate, or the format or resolution of the content. In some embodiments, this involves converting the content from a container format to an IT-specific format. For example, SDI is a format used for carrying content in many traditional video and audio content infrastructures. SMPTE ST 2022-6 is a standard that describes one way SDI content can be encapsulated into IP packets, enabling transmission of audio and video content over IP. This standard utilizes Real-time Transfer Protocol (RTP), and specifies that an RTP datagram typically includes 1376 bytes of video and related content. SDI data (e.g., video, audio, and ancillary data) can be encapsulated into a single stream of IP packets. The SDI data includes a stream of data values for each pixel that will be displayed. The data values specify the color and brightness of the pixel. When converted for encapsulation into IP packets, the SDI data is formatted as 10 bit or 12 bit samples of the color and brightness values in pixel order. A group of pixels makes up a line, and a group of lines makes up a video frame, or just frame. SMPTE ST 2022-6 also provides that switching between two signals can be performed according to RP 168-2009, which specifies a switching point to enable the downstream devices to handle the change seamlessly. While the present disclosure may refer to SMPTE ST 2022-6, other mechanisms for transmitting audio and video content in IP packets are possible, and the present disclosure can be employed with those mechanisms as well.

One aspect of IT networking that presents particular challenges for implementation of PMN standards for transmission of video content is multicast. The video traffic profile from a PMN is high bandwidth (Multiple Gbit/s per flow) and sending it through unicast using ingress replication at the video source is problematic for large networks. Multicast transmits multicast data packets (data packets that traditionally include information identifying a multicast group, such as a multicast group address) from a source to multiple receivers without unduly burdening the source. As used herein, the term "receiver" signifies a host (such as a computing device or application) that is subscribed to a multicast group. One approach is to use existing multicast solutions such as Internet Group Management Protocol (IGMP) and Protocol Independent Multicast (PIM) to forward and replicate the video across the network to the end devices. A receiver subscribes to a multicast group by sending a join message using, for example, IGMP or Multicast Listener Discovery (MLD). Typical join messages identify, to a network node to which the receiver is coupled, the multicast group the receiver wishes to join. Instead of the source replicating a multicast data packet and transmitting a copy of the multicast data packet to each receiver in the network, the source transmits a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

A multicast-enabled node typically includes a multicast forwarding table that the multicast-enabled node uses to determine where to forward the multicast data packets associated with a given multicast group. The multicast forwarding table includes information identifying each interface of the multicast-enabled node that is connected to a multicast distribution tree (MDT) to one or more receivers for the multicast group (e.g., a host that has sent a join message. Multicast-enabled nodes inform upstream nodes that they are coupled to one or more receivers using join messages, for example, a protocol independent multicast (PIM) join message. In response to receiving the join messages, a multicast-enabled node updates its multicast forwarding tables to identify interfaces to which multicast data packets are requested to be forwarded. The multicast data packets can be replicated by the multicast-enabled node as needed in order to provide the multicast data packets to receivers for the multicast group and other multicast-enabled nodes on the tree.

As can be seen, the processes traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability. In addition, the existing IGMP/PIM technology has challenges when it comes to switching delays when changing media sources during audio/live video production. One such delay is the IGMP delay arising from signaling of the multicast group address from the end-device to the router. In addition, there is a delay for setup of the PIM tree structure. These delays are much higher than the switching delays that currently occur through traditional SDI switching. The delays are also non-deterministic, which presents a problem for PMN content. With PMNs, the set of receivers for a particular source is specified by a central controlling authority. When the central controlling authority determines that the source is requested to be sent to a new set of receivers, a switch occurs. The switch timing is carefully controlled to prevent or minimize signal discontinuity. However, with multicast, the central controlling authority would have to signal a switch to the receivers, then wait for the receivers to join and for the MDT to be built hop-by-hop to the source. This fails to provide the deterministic switch times called for by PMNs.

Another difficulty with use of IGMP/PIM technology to replace SDI switches is that the SDI switch is really a "push" model in which a central controller decides which end-device gets which audio/video flow. The end-device (such as a production monitor, multi-viewer or mixer) is often not even IP enabled. With the migration to IP, IP support is being added, but use of IP multicast involves changing the functional model. IGMP/PIM is a "join" model in which the end-device has to explicitly join the video stream it wants to receive. This is very different from the push model, so that significant redesign may be required for such a transition. Adding to the difficulty of a transition from SDI to IP is the PMN industry's lack of familiarity with IP in general, much less with IP multicast using IGMP and PIM. A solution addressing the requirements of professional media networks in using IT networks while avoiding use of IP multicast protocols would therefore be desirable.

Bit Indexed Explicit Replication (BIER)

An alternative to the IGMP/PIM multicast approach described above is a "stateless multicast" technique known as Bit Indexed Explicit Replication (BIER). In BIER forwarding, which may also be referred to as "bit mask forwarding," receiver information is encoded in the packet rather than looked up in tables at each node based on multicast source and group information. Specifically, the receiver information is encoded in a bit array carried by the packet. Generally speaking, each multicast receiver is assigned a bit position in the bit array. A node connected to a receiver may also be referred to as a "receiver node" or a "destination node" herein. The value of the bit at a given bit position indicates whether the receiver node corresponding to that bit position (or, in some embodiments, the receiver node interface corresponding to the bit position) is an intended receiver, or destination, for the multicast packet carrying the bit array.

In forwarding a BIER multicast packet containing a packet bit array (or, more generally, a BIER multicast message containing a message bit array), a BIER-enabled node determines whether any intended destination nodes/interfaces for the packet are also reachable nodes/interfaces from the BIER-enabled node. This is done using a bit-indexed forwarding table stored at the BIER-enabled node, the forwarding table having an entry for each of the BIER-enabled node's neighbor (directly connected next-hop) nodes. In an embodiment, the entry for each neighbor node includes a neighbor bit array with the same mapping of bit positions to destination nodes as that of the packet bit array. In a neighbor bit array, however, the value of the bit at a given bit position indicates whether the corresponding receiver node is reachable from the neighboring node associated with the forwarding table entry containing the neighbor bit array. Whether a node is "reachable," for purposes of BIER forwarding, from a neighboring node depends on whether the neighboring node is included in the shortest path to the destination node, as determined through an interior gateway protocol (IGP) used in the network. A message bit array may also be called a "bit string" herein, and a neighbor bit array may be called a "bit mask."

If comparison of the packet bit array of an incoming BIER packet with a neighbor bit array in a forwarding table entry shows that at least one intended destination node for the multicast packet is reachable via a neighbor node, a replica of the multicast packet is forwarded to the neighbor node, using routing information from the forwarding node's unicast routing table. This process is repeated for forwarding table entries associated with any other neighbor nodes, and each forwarded replica packet is in turn handled in a similar manner when received by the respective BIER-enabled neighbor node. In this manner the multicast packet is replicated and forwarded as needed to reach the intended destinations. In some embodiments, modifications are made to a packet bit array during the forwarding process, either as a packet bit array is compared to neighbor bit arrays in successive forwarding table entries at the node, or before a replica packet carrying a packet bit array is forwarded to a neighbor node, or in both situations. Such modifications can prevent looping and replication of packets.

Figure 2A:
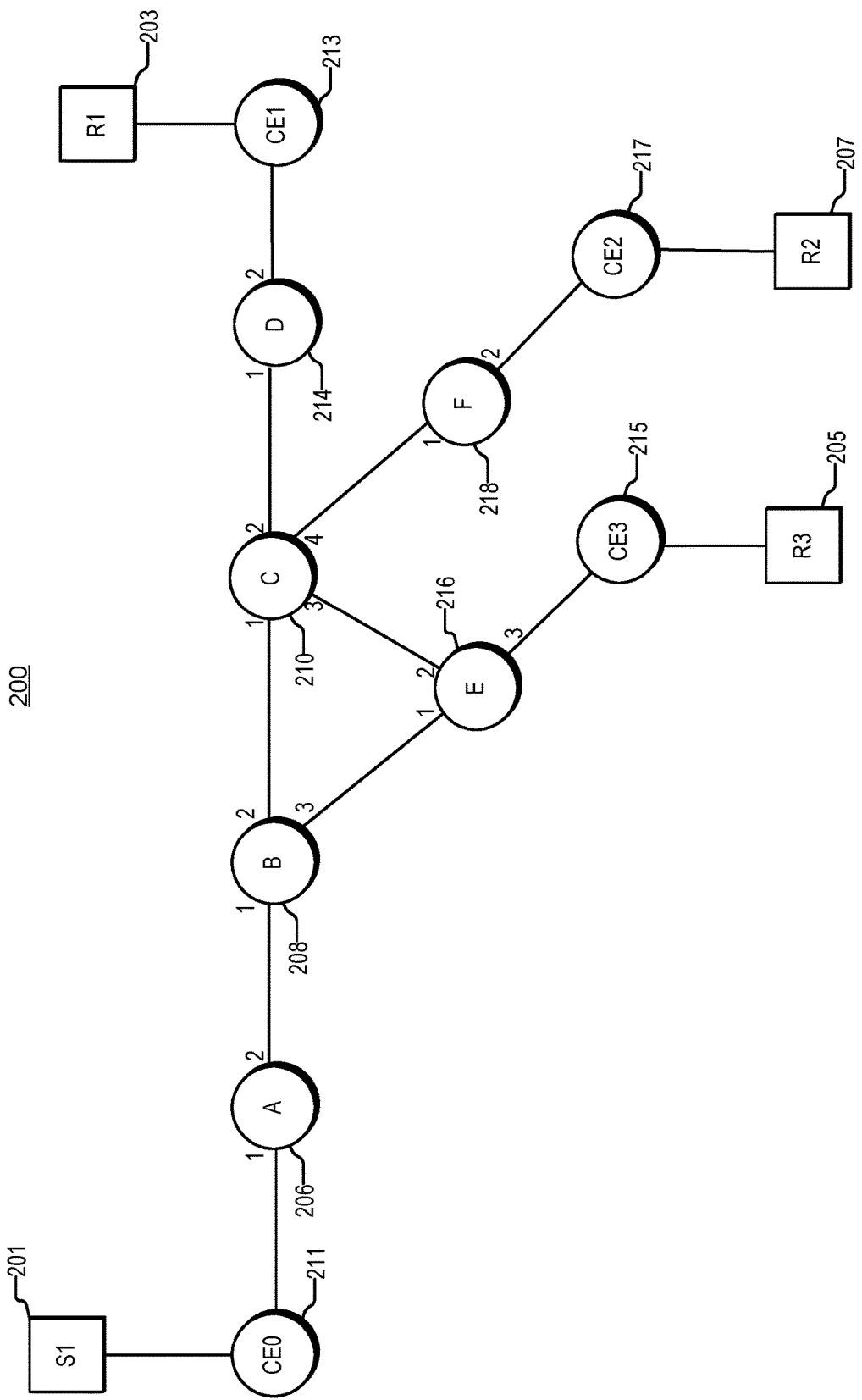
FIG. 2A is a simplified block diagram illustrating certain components of an example network.
Figure 2B:
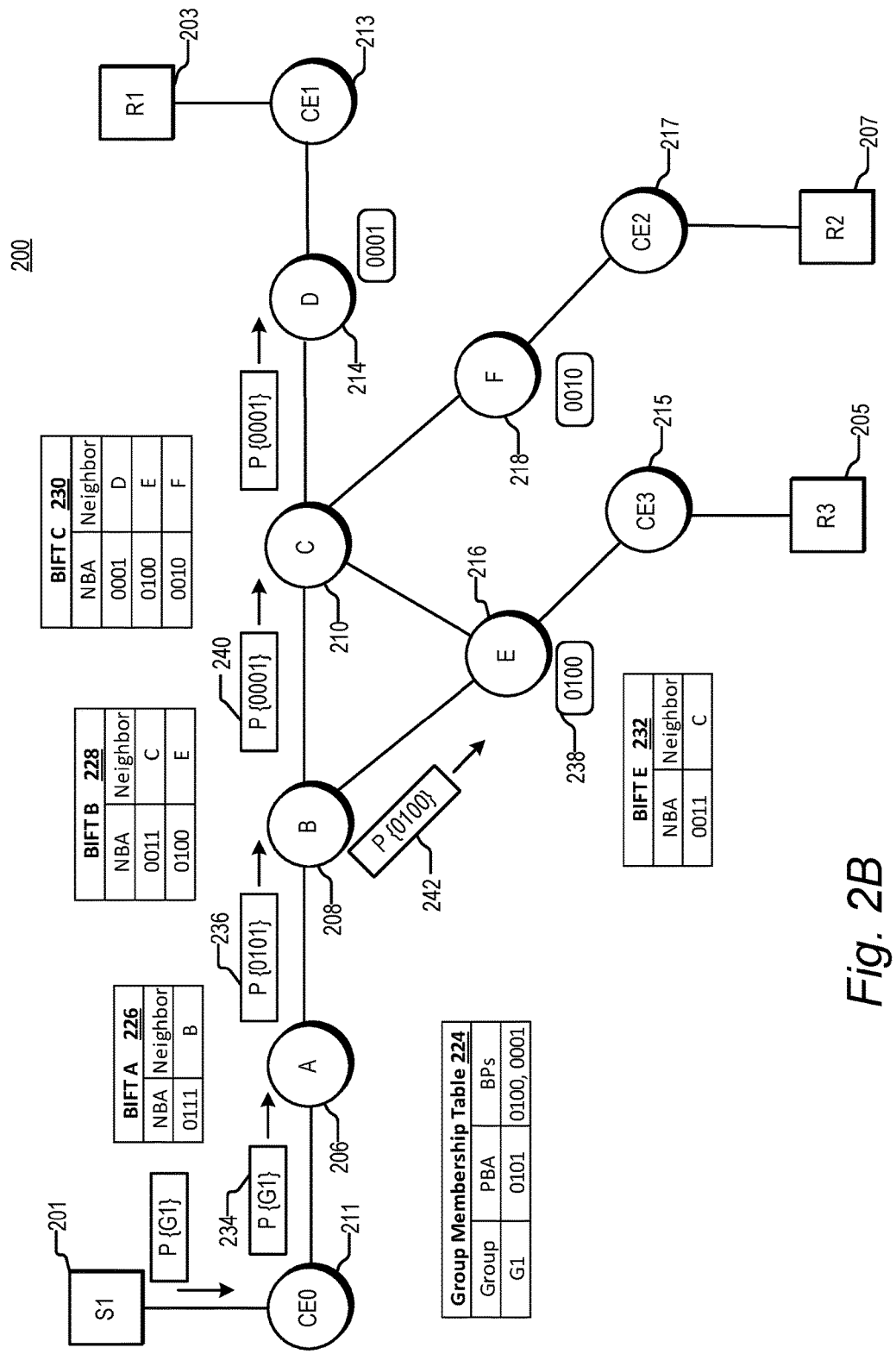
FIG. 2B is a diagram illustrating BIER forwarding through an example network.

Configuration and operation of a BIER-enabled network is described further with reference to FIGS. 2A and 2B. FIG. 2A shows an example network 200. Network 200 includes BIER-enabled nodes 206, 208, 210, 214, 216 and 218. BIER-enabled nodes are configured to forward packets using BIER. For example, BIER-enabled nodes are configured to store and use bit indexed forwarding tables, as explained further below. A BIER-enabled node may also be referred to as a "bit-forwarding router" (BFR) herein. Although "node" and "router" may be used interchangeably herein, the described nodes may in some embodiments be implemented using switches or other devices capable of carrying out the described functions. The BIER-enabled nodes in FIG. 2A form a provider network, or domain. Such a provider network could be employed by an Internet service provider to transport packets to customers. The domain includes core nodes 208 and 210, and provider edge nodes 206, 214, 216, and 218. The provider edge nodes are coupled to customer edge nodes 211, 213, 215, and 217. Hosts 201, 203, 205, and 207 are coupled to the customer edge nodes. In the embodiment of FIG. 2A, host 201 is a multicast source, while hosts 203, 205 and 207 are configured as multicast receivers, or subscribers.

Each of the BIER-enabled nodes 206, 208, 210, 214, 216 and 218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, prefix, or loopback address. The RID may also be referred to as a "BFR-Prefix" herein. In network 200 and other network diagrams described herein, these unique router identifiers are represented by capital letters such as "A" through "F". Network 200 and the other BIER-enabled networks described herein are not limited to any particular version of IP or to any particular routing or routed protocol at all. In an embodiment, each BIER-enabled node advertises or floods the routable address to the other BIER-enabled nodes in network 200. Each BIER-enabled node builds a unicast topology of the BIER-enabled nodes in network 200 using the advertised routable addresses.

BIER-enabled node 206 is configured as an ingress router for multicast data packets. A BIER-enabled ingress router may also be referred to as a "bit-forwarding ingress router" (BFIR) herein. The ingress router is coupled, via customer edge node 211, to source 201. Multicast data packets from source 201 enter the BIER network via the ingress router (BIER-enabled node 206). Each of BIER-enabled nodes 214, 216, and 218 is configured as an egress router. The egress routers can be connected (directly or via customer edge routers) to hosts, such as receivers, or other networks. An egress router is a BIER-enabled node that is the last BIER-enabled node on a path between a source and a receiver. As such, an egress router is a destination node when forwarding using BIER. The egress router may be a provider edge node that is coupled to the receiver either directly or indirectly (e.g., through a non-BIER-enabled customer edge node). A BIER-enabled egress router may also be referred to as a "bit-forwarding egress router" (BFER) herein.

In an embodiment, receiver information is included in the packet by assigning each edge router in a BIER network a bit position (BP) within a packet bit array carried by the packet (or, more generally, a message bit array carried by a network message). In an embodiment, an edge router assigned a bit position in this manner is also associated with the same relative bit position in a neighbor bit array stored in a bit indexed forwarding table at a BIER-enabled node. Either or both of the packet bit array and neighbor bit array may also be referred to as a bit mask (BM) herein. In some embodiments, the packet bit array is referred to as a bit string or BitString and the neighbor bit array is referred to as a bit mask. As used herein, the term bit array, bit string or bit mask refers to a set of bits that has a fixed or variable length. Bit Indexed Routing and Forwarding Tables In an embodiment, each BIER-enabled node in the BIER network uses the BPs and router identifiers (RIDs) of the other BIER-enabled nodes to generate one or more bit indexed routing tables (BIRTs) and bit indexed forwarding tables (BIFTs). A bit indexed routing table is a table that stores BP-to-router identifier mappings. In an embodiment, the BIER-enabled nodes learn about the BP-to-router ID mappings through advertisements sent by the BIER-enabled nodes having assigned bit positions.

In response to a BP being assigned to an egress router, the egress router, in some embodiments, advertises its BP along with its router identifier to some or all of the other nodes in the BIER network. In one embodiment, the egress router advertises its BP via an interior gateway protocol (IGP). Within an autonomous system, an IGP is used for exchanging network topology information between nodes (all nodes, whether BIER-enabled or not). There are different types of IGPs, which vary in terms of, for example, the particular information exchanged between nodes, whether information is shared primarily with neighbor nodes or "flooded" throughout the autonomous system, and how often the exchanged information is updated. In one type of IGP called a link-state routing protocol, routers construct topological maps of network connectivity in the form of a graph, showing which routers are connected to which other routers. Each router can use its map to independently calculate, typically using some suitable algorithm such as a shortest-path-first algorithm, a logical path from it to possible destinations in the network. The collection of calculated paths will then form the routing table. Examples of link-state routing protocols include the intermediate system to intermediate system (IS-IS) and the Open Shortest Path First (OSPF) protocols. Messages called advertisements are used in IGPs to exchange information. Nodes in an IP network automatically exchange network topology information through IGP advertisements.

In an embodiment, ISIS and/or OSPF protocols can be modified to assist in distributing BP-to-router ID mappings through the BIER network using link state updates. In OSPF, such a link state update is called a link-state advertisement (LSA). Certain types of LSAs are "opaque" LSAs which are forwarded through the network even by nodes that do not themselves have the capability to use the information in the LSA. Such opaque LSAs may be useful in networks having both BIER-enabled and non-BIER enabled nodes. Other flooding mechanisms to distribute the information are possible. BIER-enabled nodes in a BIER network, whether or not they are egress routers, also flood their respective router identifiers, which are used in building network topology, routing and forwarding tables. BIER-enabled nodes, in one embodiment, advertise additional information as well, such as a bit mask size that the BIER-enabled node is configured to use. Adding such BIER information to the advertised information results in a relatively small amount of additional information, as compared with the usual topology information exchanged through IGP advertisements, or with the state information maintained on a per-group basis in traditional multicast.

Using a mechanism such as IGP advertisements, each BIER-enabled node receives BP-to-router identifier mappings and stores them in a BIRT. Other information can be included in the BIRT, depending on the particular BIER implementation. In an embodiment using a Multiprotocol Label Switching (MPLS) implementation of BIER, for example, the BIER-enabled node may also include at least one label range in the BIRT for each router ID.

Using the router identifiers, a BIER-enabled node, in an embodiment, performs a recursive lookup in unicast routing tables to identify a directly connected next hop BIER-enabled node (referred to herein as a neighbor) on the shortest path toward the "destination" BIER-enabled node associated with the BP, and the interface via which the neighbor is reachable. In one embodiment, the neighbor is the next hop on a shortest path towards the egress router that originated the advertisement of the bit position. Each BIER-enabled node translates its BIRT(s) into one or more bit indexed forwarding tables (BIFTs) used for forwarding of BIER messages. A BIFT maps each neighbor node (and/or the egress interface for reaching the neighbor node) to the bit positions of destination nodes reachable via that neighbor node.

BIER Packet Forwarding Example

To illustrate the operation of BIER packet forwarding, network 200 of FIG. 2A is shown again with additional annotation in FIG. 2B. In the embodiment of FIG. 2B, BIER-enabled node 214 (an egress router) signals to BIER-enabled node 206 (an ingress router) that BIER-enabled node 214 is interested in receiving packets associated with a given multicast group or flow. A "flow" as used herein is a stream of one or more messages traveling between a particular source and a particular destination (or set of destinations) having a set of common properties. BIER-enabled node 216 likewise signals BIER-enabled node 206 that BIER-enabled node 216 is interested in the same multicast group. In an embodiment, this signaling is done via an "overlay" mechanism not explicitly shown in FIG. 2B, such as an exterior gateway protocol or a control protocol used by a network controller. BIER-enabled node 206 updates an entry in group membership table (GMT) 224 (or creates one if one does not already exist) for the multicast group and updates a packet bit array (PBA) in the entry by setting bits corresponding to BIER-enabled nodes 214 and 216. The bit position 238 for node 216 has a value represented by bit string 0100 having bit 3 of the four bits (counting from the least significant bit at the right) set to 1. Similarly, the bit position assigned to node 214 has a value represented by the bit string 0001 having bit 1 set. In an embodiment in which other BIER-enabled nodes with assigned bit positions are not interested in the flow, the PBA includes set bits for the two bit positions of nodes 214 and 216, for an array of {0101}.

In the simplified example of FIG. 2B, the packet bit array and neighbor bit arrays used are four bits long, which is sufficient to represent the three egress routers in network 200, each connected to a respective one of the three receivers in the network. In this example, a "1" value in a bit position of a packet bit array indicates that the corresponding destination node is an intended destination for the packet. An alternative convention for the value at a bit position could be used in another embodiment, but in any case the value of the bit at a bit position in a packet bit array indicates whether the corresponding destination node is an intended destination. In FIG. 2B, icons representing multicast packets, such as original packet 234 and BIER-encapsulated packet 236, are superimposed onto the diagram of network 200. The icons represent snapshots taken at successive times as the packet (or replicas of the packet) moves through the network in the direction of the arrows. At one point in time, for example, packet 236 is moving from node 206 ("A") to node 208 ("B"). At a subsequent point in time, packet 236 has been replicated and forwarded on, so that packet replicas 240 and 242 are moving from node B toward nodes 210 ("C") and 216 ("E"), respectively.

BIER-enabled node (and ingress router) 206 is configured to receive a multicast data packet 234 addressed to the multicast group or flow G1 (e.g., from source 201 via customer edge node 211). In the embodiment of FIG. 2B, BIER-enabled node 206 uses the multicast group address and/or source address included in the multicast data packet to access its GMT 224 and select a packet bit array associated with the multicast group. After selecting a PBA that corresponds to the multicast group from GMT 224, BIER-enabled node 206 encapsulates the packet bit array into the multicast data packet, resulting in BIER packet 236. The encapsulation adding BIER information to the IP packet can take various forms. In some embodiments, for example, existing encapsulations such as Internet Protocol version 6 (IPv6) or Multiprotocol Label Switching (MPLS) can be adapted or extended to carry BIER-related information. For example, a message bit array is written to the destination address field of an IPv6 header in one embodiment. In another embodiment, a message bit array is written to one or more IPv6 extension headers. In an embodiment employing MPLS encapsulation, a message bit array is included in a stack of MPLS labels. In another MPLS embodiment, the message bit array may be encoded outside of the MPLS label structure, between the MPLS label stack and the payload of the message. Dedicated encapsulation schemes for incorporation of BIER information may also be employed in some embodiments.

Ingress node 206 also identifies the neighbors to which BIER-encapsulated packet 236 will be forwarded. In an embodiment, the neighbors are identified using the bit indexed forwarding table (BIFT) of node 206, a portion 226 of which is shown in FIG. 2B. In a further embodiment, this involves performing an AND operation between the packet bit array and each neighbor bit array (NBA) in BIER-enabled node 206's BIFT. In this example, the entry in the BIFT corresponds to BIER-enabled node 208. This means that the shortest path from BIER-enabled node 206 to the three egress routers in network 200 runs through BIER-enabled node 208. Since the result of the AND is TRUE for neighbor B (BIER-enabled node 208), BIER-enabled node 206 forwards the multicast data packet to BIER-enabled node 208. This forwarding may involve other information from the BIFT for node 206 not shown in portion 226, such as egress interface information.

In an embodiment, in response to receiving the multicast data packet, BIER-enabled node 208 performs an AND between the packet bit array in the multicast data packet, {0101}, and the neighbor bit array in each entry in its BIFT (a portion 228 of which is shown). The result for neighbor C is TRUE so BIER-enabled node 208 forwards replica 240 of the multicast data packet to BIER-enabled node 210. In the embodiment of FIG. 2B, BIER-enabled node 208 modifies the packet bit array in the multicast data packet it forwards, as discussed further below. The result for neighbor E is also TRUE, so BIER-enabled node 208 replicates the multicast data packet and forwards replica 242 of the multicast data packet to BIER-enabled node 216, which is an egress router. In the example of FIG. 2B, a "1" value in a bit position of a neighbor bit array indicates that the destination node assigned to the bit position is reachable from the neighboring node corresponding to the forwarding table entry containing the neighbor bit array. An alternative convention for the value at a bit position could be used in another embodiment, but in any case the value of the bit at a bit position in a neighbor bit array indicates whether the corresponding destination node is a reachable destination from the neighbor associated with the neighbor bit array.

In an embodiment, BIER-enabled node 210, in response to receiving a copy of the multicast data packet, performs an AND between the packet bit array in the multicast data packet, {0001}, and the neighbor bit array in each entry in its BIFT (portion 230 of which is shown). The result for neighbor D is TRUE so BIER-enabled node 210 forwards the multicast data packet to BIER-enabled node 214 which is an egress router. The result for neighbor F is FALSE, so BIER-enabled node 210 refrains from forwarding the multicast data packet to BIER-enabled node 218. In this way the multicast data packet travels from the ingress router (BIER-enabled node 206) through the BIER network to the two egress routers that signaled an interest in the multicast group (BIER-enabled nodes 214 and 216).

In the embodiment of FIG. 2B, each time the BIER packet is forwarded using an entry in a bit indexed forwarding table, the packet bit array in the forwarded packet is altered to clear any set bits in bit positions corresponding to nodes not reachable from the neighbor that the packet is being forwarded to. For example, when the multicast packet arrives at node B, it has an incoming packet bit array of {0101}. Comparison of the packet bit array to the neighbor bit arrays shown in BIFT portion 228 shows that the set first (rightmost) bit of the PBA corresponds to a destination node reachable through neighbor C, while the set third bit corresponds to a node reachable through neighbor E. The packet bit array in the packet forwarded to neighbor C accordingly has only the first bit set, and the PBA in the packet forwarded to neighbor E has only the third bit set. This modification of the packet bit array when a BIER packet is forwarded prevents looping and duplication by ensuring that a BIER-enabled node forwards a given multicast data packet only once based on a given bit position. This alteration of the packet bit array to clear bits that are not also set in the neighbor bit array can be interpreted as a form of masking by the neighbor bit array.

In addition to alteration of the packet bit array sent with a forwarded packet (which may also be called a forwarded packet bit array herein), the packet bit array used at a BIER-enabled node for comparison to each neighbor bit array within a BIFT may be modified each time a packet is sent. Specifically, if a packet is sent as a result of comparing the incoming PBA to a neighbor bit array in a bit indexed forwarding table at the node, the PBA used for comparison to the next neighbor bit array in the forwarding table is altered to remove the destinations of the just-sent packet as intended destinations. In one embodiment, this alteration includes performing a bitwise AND operation between the incoming PBA and the inverse of the neighbor bit array corresponding to the neighbor node to which a packet was just sent. This has the effect of clearing those bits corresponding to bit positions which were set in the forwarded PBA of the outgoing packet. This alteration can prevent sending of a duplicate packet in a case for which multiple forwarding table entries have an NBA with the same bit set. This can happen, for example, in equal cost multi-path (ECMP) arrangements.

BIER Replication Fabric

One approach to transmission and switching of PMN content in an IP network is described in U.S. Pat. No. 9,571,897. This approach uses a BIER network as described above in connection with FIGS. 2A and 2B to implement one or more switching elements such as elements 130 and 140 of broadcast facility 110 in FIG. 1. In an embodiment of this approach, an SDI signal from a video source is converted to a stream of IP packets. The IP packet stream is received by an ingress node of a BIER network and encapsulated with a BIER packet bit array. The packet bit array is chosen using an IP multicast group identifier, such as an IP multicast group address carried by the IP packet. In an embodiment, a controller keeps track of which BIER bit positions are associated with which IP multicast groups, by receiving join messages (such as IGMP messages) from receivers having assigned bit positions. The approach of U.S. Pat. No. 9,571,897 allows signal switching to be implemented at the ingress of the BIER network, by changing the bit array applied to incoming packets, and thereby changing the packets' destinations. This switching of the bit array can be done at a frame boundary. This approach can also eliminate the need for IP multicast tree formation, and the associated delay, by performing the multicast function in the BIER network. IP multicast group membership is still employed in embodiments of this solution, however, so that IGMP signaling delays are still incurred.

Figures 3A, 3B, 3C, 5A, 5B, 5C, 5D, 5E:
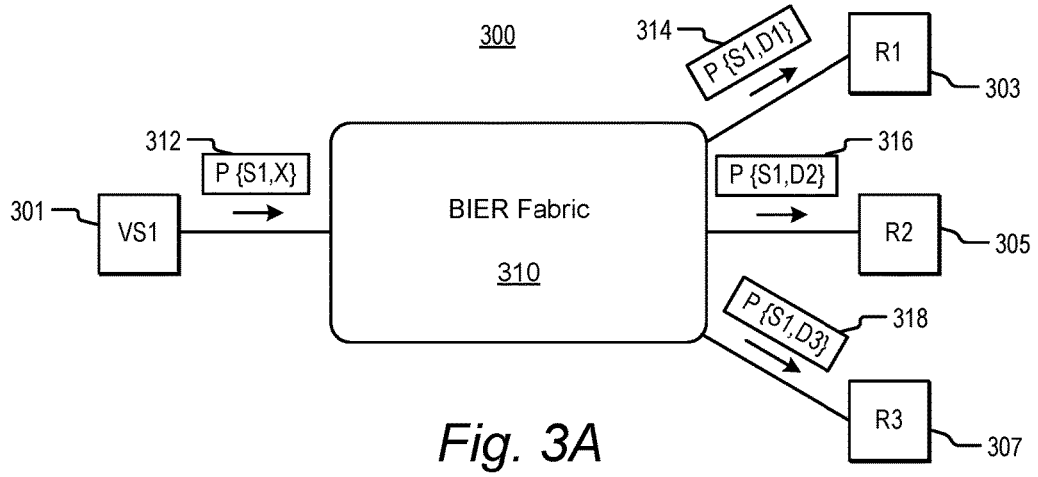
FIG. 3A is a simplified block diagram illustrating certain components of an example network including a BIER fabric.
FIG. 3B illustrates an example of a BIER imposition table for the BIER fabric of FIG. 3A.
FIG. 3C illustrates an example of a BIER disposition table for the BIER fabric of FIG. 3A.
FIGS. 5A-5D illustrate examples of bit indexed routing tables for nodes in the network of FIG. 4A.
FIG. 5E illustrates an example of a bit indexed forwarding table for a node in the network of FIG. 4A.

In the methods, networks, and devices disclosed herein, a BIER replication fabric is employed for replication and switching of IP signals without the use of IP multicast protocols such as PIM and IGMP. The lack of IP multicast is believed to simplify management and troubleshooting of PMNs using IP. A simplified view of a PMN employing such a BIER replication fabric is shown in FIG. 3A. In PMN 300 of FIG. 3A, BIER Fabric 310 is connected between video source 301 and receivers 303, 305 and 307. In an embodiment, BIER Fabric 310 replaces one or more switching elements such as elements 130 and 140 of broadcast facility 110 in FIG. 1. The specific configuration of BIER fabric 310 is discussed further below in connection with other drawings of this disclosure. In some embodiments, BIER fabric 310 is implemented using a single switch. In other embodiments, fabric 310 comprises a network of routers. In an embodiment, a BIER fabric such as fabric 310 is designed so that any of the sources connected to the fabric can be linked to any of the receivers connected to the fabric.

In the embodiment of FIG. 3A, video source 301 is marked with the notation VS1, denoting a unique identifier for the source. Receivers 303, 305 and 307 are marked with respective notations R1, R2 and R3, denoting unique identifiers for the receivers. In an IP-enabled device, for example, a unique identifier may be implemented as an IP address, prefix or loopback address. The unique identifier may also take other forms, such as a media access control (MAC) address. Sources, receivers and network nodes may be referenced herein using their respective unique identifier notations. In an embodiment, sources such as VS1 and receivers such as R1, R2 and R3 are within a broadcast facility such as facility 110 of FIG. 1. Alternatively, one or more of the sources or receivers coupled to a BIER fabric such as fabric 310 may be located remotely with respect to a broadcast facility.

Although not explicitly shown in FIG. 3A, network 300 employs a controller in some embodiments. In addition to carrying out functions associated with a broadcast facility controller such as controller 120 of FIG. 1, the controller in network 300 configures and manages aspects of BIER fabric 310, as described in more detail below in connection with other drawings. In an embodiment, control functions are performed using more than one controller.

As shown in FIG. 3A, BIER fabric 310 receives a unicast IP packet 312 from source VS1. At the ingress of BIER fabric 310, packet 312 is encapsulated with a bit array determining which receivers the packet is sent to. Replication and forwarding is carried out within the BIER fabric so that a packet for each intended receiver is produced. In the embodiment of FIG. 3A, unicast replica IP packets 314, 316 and 318 are produced for delivery to receivers R1, R2 and R3, respectively.

BIER fabric 310 includes stored imposition information, such as that in BIER imposition table 320 shown in FIG. 3B. The imposition information maps the IP address of the incoming packet to the packet bit array that the packet is to be encapsulated with for forwarding within the BIER fabric. In the embodiment of FIG. 3A, IP packet 312 has an IP source address value denoted by S1 and a destination address value denoted by X. S1 represents an IP address associated with video source VS1. In an embodiment, source address S1 is sufficient to identify the flow that the packet belongs to. For example, the source address may identify the camera providing a video stream. In such an embodiment, it would be sufficient to include source address S1 by itself in the IP flow column of imposition table 320 in FIG. 3B. Destination address value X is not important in an embodiment for which the flow is defined by the source address, and is not necessarily checked at the ingress to BIER fabric 310. In such an embodiment, "X" can be interpreted as "unspecified." In alternative embodiments, an address value X may be assigned in conjunction with formation of packet 312, and used at the ingress of BIER fabric 310 in characterizing the flow that the packet belongs to and determining which bit positions correspond to receivers for a packet in that flow. In general, imposition information such as imposition table 320 is used to characterize the flow using an incoming IP packet's source address, destination address, or both, and to identify bit positions corresponding to intended receivers for the flow. The packet is encapsulated for BIER forwarding using a bit array identifying those intended receivers. In an embodiment, the bit array has set bits in bit positions corresponding to the intended receivers.

As shown in table 320 of FIG. 3B, intended receivers for incoming packet 312 are those having assigned bit positions 1, 2 and 3. These bit positions could alternatively be represented in table 320 as a packet bit array having set bits in its first, second and third bit positions. In the embodiment of FIG. 3A, bit positions 1, 2 and 3 correspond to receivers R1, R2 and R3, respectively. Receivers R1, R2 and R3 also have assigned IP destination addresses, denoted as D1, D2 and D3, respectively. Although not shown in the embodiment of table 320, an imposition table may generally include multiple entries mapping respective source and/or destination addresses to appropriate packet bit arrays. In addition to stored imposition information, BIER fabric 310 stores disposition information, such as that in BIER disposition table 330 shown in FIG. 3C. The disposition information maps receiver bit positions to IP addresses for the receivers. Using the disposition information, IP addresses for each of the intended receivers of a BIER packet are determined at the egress of the BIER fabric. For each receiver IP address, an IP packet (without BIER encapsulation) is sent from the BIER fabric to the corresponding receiver. In the embodiment of FIG. 3A, packet 314 having IP source address S1 and IP destination address D1 is sent to receiver R1. Similarly, packet 316 with source address S1 and destination address D2 is sent to receiver R2, and packet 318 with source address S1 and destination address D3 is sent to receiver R3. Packets 314, 316 and 318 are sent as IP unicast packets, so that no IP multicast protocols are needed.

Figures 4A, 4B, 4C, 4D, 4E, 4F:
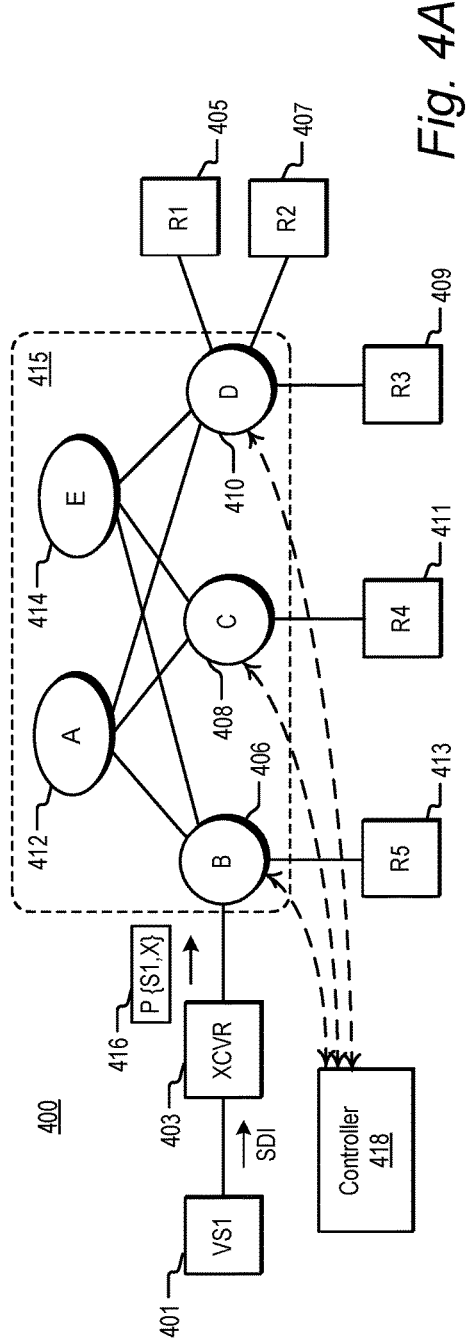
FIG. 4A is a simplified block diagram illustrating certain components of an example network including a BIER fabric.
FIG. 4B illustrates exemplary receiver information for the network of FIG. 4A.
FIG. 4C illustrates an example of a BIER imposition table for the network of FIG. 4A.
FIGS. 4D-4F illustrate examples of BIER disposition tables for nodes in the network of FIG. 4A.

A block diagram illustrating another example of a network including a BIER fabric is shown in FIG. 4A. Network 400 of FIG. 4A includes a video source 401 denoted VS1 and transceiver 403. In an embodiment, VS1 is a video capture device such as a camera. In an embodiment, transceiver 403 includes a transmitter for video signals from a video source and a receiver for video signals being provided to, for example, a display device. In the embodiment of FIG. 4A, video source 401 produces a video signal in SDI format, which is converted to IP packets, including packet 416, by transceiver 403. In an alternative embodiment, a video source such as source VS1 is combined in a single unit with a transmitter or transceiver, and video from the combined unit is available as a stream of IP packets.

Nodes 406, 408, 410, 412, and 414, having unique identifiers B, C, D, A and E, respectively, comprise a BIER fabric 415 in network 400. In the embodiment of FIG. 4A, the BIER fabric is in the form of a leaf-spine network, where nodes A and E are configured as spine nodes (which may also be referred to as "spine switches" herein) and nodes B, C and D are configured as leaf nodes (which may also be referred to as "leaf switches" herein). A leaf-spine network as used herein has the characteristic that each spine node is directly connected to every leaf node, so that any leaf node can reach any other leaf node using a two-hop route including a single spine node. This architecture may make network delays more predictable and consistent. In other embodiments, the BIER fabric may comprise a group of nodes interconnected using a different topology, however, including arrangements similar to that in network 200 of FIG. 2A. In the embodiment of FIG. 4A, node B is the ingress node at which packet 416 enters the BIER fabric. Receivers 405 (assigned unique identifier R1), 407 (assigned unique identifier R2) and 409 (assigned unique identifier R3) are connected to leaf node D of BIER fabric 415. Receiver 411, having unique identifier R4, is connected to leaf node C and receiver 413, having unique identifier R5, is connected to leaf node B.

Network 400 further includes a controller 418. In an embodiment, controller 418 is a controller host external to the data path of network 400. In an alternative embodiment, a network node, such as ingress node B of BIER fabric 415, is configured to perform some or all of the functions of controller 418. In an embodiment, controller 418 interacts with each of the BIER fabric nodes through a mechanism and/or protocol different than those used to forward packets through the BIER fabric. This interaction may be referred to as "out-of-band" or "overlay" signaling. Exemplary interactions between controller 418 and nodes B, C and D are illustrated by dashed lines in FIG. 4A. Although additional dashed lines are omitted from FIG. 4A for clarity, similar communications can also occur between controller 418 and other nodes such as nodes A and E. Controller 418 may also communicate with source VS1, transceiver 403, and/or any of receivers R1 through R5 in some embodiments.

Communication between controller 418 and nodes, receivers or other components of network 400 may occur through one or more control protocols. As an example, communications with controller 418 may occur using the NETCONF and/or RESTCONF protocols and the YANG data modeling language. These protocols are described further in, for example, "Network Configuration Protocol (NETCONF)," by R. Enns, M. Bjorklund, J. Schoenwaelder, and A. Bierman, Eds., RFC 6241, June 2011, available at https://tools.ietf.org/html/rfc6241, "RESTCONF Protocol," by A. Bierman, M. Bjorklund, and K. Watsen, Jun. 4, 2015, available at https://tools.ietf.org/html/draft-ietf-netconf-restconf-05, and "YANG—A Data Modeling Language for the Network Configuration Protocol (NETCONF)," by M. Bjorklund, Ed., RFC 6020, October 2010, available at https://tools.ietf.org/html/rfc6020, which documents are incorporated by reference as if fully set forth herein. As another example, controller 418 may communicate with nodes A through E using a border gateway protocol (BGP) in some embodiments. In some embodiments, controller 418 is implemented using a software defined networking platform such as OpenDaylight™. Communications with controller 418 are carried over data links to controller 418 that are not explicitly shown in FIG. 4A. In an embodiment, control communications between elements of network 400 and controller 418 are carried over some or all of the same physical links used for transmission of data messages through network 400, although different protocols are used for the data transmission and the control communications.

The functions of controller 418 include, in some embodiments, populating and updating imposition information and disposition information stored in the BIER fabric, such as imposition table 320 of FIG. 3B or disposition table 330 of FIG. 3C. In some embodiments, controller 418 also performs functions of a broadcast facility controller as described above for controller 120 of FIG. 1. Broadcast facility control functions may be performed by a controller separate from controller 418 in alternative embodiments. In some embodiments, controller 418 may perform still further functions, such as assignment of BIER bit positions to receivers R1 through R5, or assignment of router IDs to nodes within network 400. Embodiments employing a controller such as controller 418 may be associated with software-defined networking (SDN) implementations.

Each of receivers R1 through R5 in network 400 is assigned both a bit position and an IP address. In some embodiments, a single bit position may be assigned to more than one receiver, if all receivers assigned to the bit position can be treated the same way in terms of receiving or not receiving a packet stream. In an embodiment, the association of a bit position with a receiver is stored at the nearest BIER-enabled node (such as node D for receivers R1 through R3) or at a network controller, with the receiver being "unaware" of any BIER-related information. In a further embodiment, bit positions associated with a router (or switch) within the BIER fabric are advertised throughout the BIER fabric using an IGP. An embodiment of bit position and IP address assignments for receivers R1 through R5 of FIG. 4A is shown in the table of FIG. 4B. In the embodiment of FIG. 4B, receivers R1 and R2, while having separate IP addresses, are both assigned bit position "1". This will cause packets to be sent (or not sent) to both of these receivers together. In an embodiment, a mapping of receivers to bit positions and IP addresses such as that shown in FIG. 4B is stored at a network controller. Mapping of the bit positions in FIG. 4B to the associated IP addresses is also stored as disposition information at leaf nodes in FIG. 4A, as discussed further below. Although IPv4 addresses are shown in FIG. 4B for purposes of illustration, the embodiments of this disclosure can also be implemented using IPv6 addresses or addresses for future versions of IP. Such IP implementations would be understood by one of ordinary skill in the art of networking in view of this disclosure.

An example of a table storing BIER imposition information for the BIER replication fabric of network 400 is shown in FIG. 4C. Imposition table 420 of FIG. 4C is stored at ingress node B of the BIER fabric. In an embodiment, table 420 is populated and updated by controller 418. Table 420 may also be configured manually in some embodiments. In the embodiment of FIG. 4C, the IP flow having source address S1 and unspecified destination address is to be encapsulated with a BIER packet bit array of 1101. Intended destinations for incoming packet 416 are therefore receivers R1, R2, R4 and R5, because these receivers correspond to bit positions 1, 3 and 4, which have set bits in the packet bit array.

Examples of tables storing BIER disposition information for BIER replication fabric 415 are shown in FIGS. 4D through 4F. In an embodiment, disposition tables such as tables 430, 440 and 450 of FIGS. 4D through 4F are populated and updated by controller 418. Disposition table 430 of FIG. 4D is stored at ingress node B of BIER fabric 415, because node B is connected to receiver R5, which is represented in table 430 by its assigned bit position value of 4. In an embodiment, a forwarding engine at node B receives a BIER-encapsulated IP packet after the incoming IP packet is encapsulated by an encapsulation engine at node B. In some embodiments of a network comprising a BIER replication fabric, other nodes in the BIER fabric may be ingress nodes for other sources (not shown in FIG. 4A), so that node B can also receive BIER-encapsulated packets from other nodes in the BIER fabric.

Upon receiving a BIER-encapsulated packet, the forwarding engine at node B determines whether an intended receiver for the packet, as indicated by the BIER packet bit array, is a local receiver for that node. In an embodiment, local receivers for a node are those directly connected to the node. In another embodiment, a local receiver for a node is remotely connected to the node, but is assigned to that node for purposes of interaction with the BIER replication fabric. In the embodiment of FIG. 4A, receiver R5 is a local receiver for node B. If the BIER encapsulation in network 400 uses the convention that a set bit at a given bit position in the packet bit array indicates that the receiver assigned that bit position is an intended receiver, a packet having a set bit in bit position 4 of its bit array is recognized at node B as intended for local receiver R5. For such a packet, the forwarding engine at node B makes a replica packet without the BIER encapsulation, and sets an IP destination address of the packet to the address corresponding to bit position 4 in disposition table 430. The replica packet is then forwarded as a unicast IP packet.

Disposition table embodiment 440, stored at node C of BIER fabric 415, is shown in FIG. 4E. Node C is connected to receiver R4, which is represented in table 440 by its assigned bit position value of 3. In an embodiment, a forwarding engine at node C receives BIER-encapsulated packets from one or both of spine nodes A and E of BIER fabric 415. In a similar manner as described for node B above, a forwarding engine at node C determines whether an intended receiver for the encapsulated packet is a local receiver for the node, and if so sends a replica of the packet to the local receiver via IP unicast. In particular, if the BIER packet bit array of the encapsulated packet indicates that bit position 3 is assigned to an intended receiver, the BIER encapsulation is removed (or a replica packet without the encapsulation is created) and the IP address of 192.168.2.1, corresponding to bit position 3 in table 440, is written to the destination address field of the resulting packet. The packet is then sent to receiver R4 via IP unicast.

Disposition table embodiment 450, stored at node D of BIER fabric 415, is shown in FIG. 4F. In a similar manner as described for nodes B and C above, a forwarding engine at node D determines whether an intended receiver for the encapsulated packet is a local receiver for the node, and if so sends a replica of the packet to the local receiver via IP unicast. Node D has multiple local receivers, and therefore sends a packet replica to each receiver that is an intended destination for a given packet. Disposition table 450 also shows that bit position 1 is assigned to both receiver R1 and receiver R2. As noted above in connection with FIG. 4B, a packet carrying a message bit array identifying bit position 1 as representing a local receiver will therefore be replicated to send one packet replica to receiver R1, using one of the IP addresses mapped to bit position 1 in table 450, and another packet replica to receiver R2, using the other IP address mapped to bit position 1 in table 450. In embodiments for which the same video stream is sent to multiple receivers simultaneously, use of shared bit positions such as bit position 1 in FIG. 4F allows more receivers to be addressed using fewer bit positions, mitigating the effect of limitations on bit array length.

In the embodiment of FIGS. 4A through 4F, disposition information stored at each of leaf nodes B, C and D is associated with the respective receivers local to each node. In an alternative embodiment, disposition information for all receivers connected to the BIER replication fabric is stored at each egress node for the fabric. In such an embodiment, rather than relying on its BIER disposition table in determining which receivers are locally connected, a forwarding engine may use other information stored at the node, such as an address resolution protocol (ARP) table, to make this determination. Maintaining all of the disposition information at each node may provide additional configurability for the professional media network, allowing receivers to be moved from one egress node to another.

Examples of bit indexed routing tables for nodes within BIER fabric 415 are shown in FIGS. 5A through 5D. In an embodiment, each router having a locally-connected receiver advertises, using IGP advertisements, the BIER bit position assigned to that receiver along with the router ID (for example, the loopback address) of the router. Routers within the BIER fabric then generate routing tables using the received advertisements, in a similar manner to that described above in connection with BIER network 200 of FIGS. 2A and 2B. In the embodiment of leaf-spine network 400, leaf nodes B, C and D have locally-connected receivers and will therefore advertise bit positions. Spine nodes A and E advertise router identifiers along with other information normally advertised using an IGP.

Table 500 shown in FIG. 5A is an embodiment of a bit indexed routing table for node B. Identifiers for each of the nodes in BIER fabric 415 reachable from node B and having advertised bit positions are included in the "Router ID" column of table 500, along with the bit positions (in the "BP" column) corresponding to each node. Because node D is connected to receivers having two different assigned bit positions, table 500 includes entries for node D including both bit position 1 and bit position 2. Table 500 also includes a "Neighbor" column with identifiers of neighbor nodes via which each of the identified leaf nodes is reachable. For bit position 4 no neighbor node is identified in table 500, since that bit position is assigned to a receiver local to node B. Because each spine node in leaf-spine network 400 is connected to every leaf node, there are, in an embodiment, two equal-cost paths from node B to each of the other leaf nodes, one path via spine node A and another via spine node E. Table 500 therefore includes two entries, one with neighbor node A and one with neighbor node E, for each of bit positions 1, 2 and 3. Bit indexed routing table 510 of FIG. 5B has entries similar to those of table 500, except that the identified nodes are those reachable from node C, and table 520 of FIG. 5C is includes entries for nodes reachable from node D.

As discussed above in connection with network 200, bit indexed forwarding tables are generated at each of leaf nodes B, C and D using information from each node's respective bit indexed routing table. The equal-cost multipath (ECMP) situation reflected in bit indexed routing tables 500, 510 and 520 can be handled in various ways. In general, the forwarding node selects one of the ECMP paths to use in forwarding a packet to a given destination. Criteria which may be used in selecting among ECMP paths include, for example, sending packets belonging to the same flow along the same path and selecting paths to achieve load balancing between paths when possible. In some embodiments, a value carried by the packet, such as an entropy value, a source or destination address, or a hash value calculated from such a value, is used in selecting an ECMP path. A flow value may in some embodiments be included in an entry of a disposition table such as table 420 of FIG. 4C, and incorporated by an ingress node into a BIER-encapsulated packet. In an embodiment, a selection is made from among multiple neighbor nodes, representing respective ECMP paths, included in a single bit indexed forwarding table. In an alternative embodiment, separate forwarding tables reflecting distinct paths are generated at a node, and the selection is made from among the multiple forwarding tables. Additional description of BIER forwarding in ECMP situations is provided in co-pending U.S. patent application Ser. No. 14/603,501, which application is hereby incorporated by reference in its entirety and for all purposes as if fully set forth herein. In some alternative BIER replication fabric embodiments, such as certain embodiments not incorporating a leaf-spine network topology, ECMP situations are less likely to arise.

An example of a bit indexed routing table for use by spine node A or spine node E of BIER fabric 415 is shown in FIG. 5D. In the case of spine nodes A and E, the "Neighbor" column of table 530 is the same as the "Router ID" column of table 500, 510 or 520, since there is a direct connection from each spine node to each of the leaf nodes. An example of a bit indexed forwarding table for node A or node E is shown in FIG. 5E. Table 540 of FIG. 5E has an alternative form to that of the bit indexed forwarding tables shown in FIG. 2B. In addition to including a neighbor bit array associated with each neighbor node, where the neighbor bit array indicates the receivers reachable via that neighbor, table 540 includes a Bit Position column used to sort the table entries in an alternative manner Table 540 includes a separate entry for each bit position represented in a neighbor bit array, or each bit position of a receiver reachable from a given neighbor node. Because node D has locally-connected receivers corresponding to two bit positions, there are two forwarding table entries including node D as the neighbor to be forwarded to. By contrast, the forwarding tables shown in FIG. 2B include just one entry per neighbor node, even when destinations corresponding to multiple bit positions are reachable from one neighbor.

The different entry structure and sorting of table 540 as compared to the forwarding tables of FIG. 2B can be used in a variation of the BIER forwarding process carried out at a forwarding node. In the BIER forwarding process described above, the message bit array carried by a received message is compared to the neighbor bit array in each forwarding table entry, to determine whether a copy of the message is to be sent to the neighbor node identified in the entry. As an alternative to this process of comparing the message bit array to the neighbor bit array for each neighbor in the forwarding table, a process using forwarding table 540 of FIG. 5E includes first identifying a set bit in the message bit array of the received message. When a set bit is found, the forwarding table is checked for an entry including the bit position of that set bit. In networks for which the number of intended egress nodes or receivers for a received message (represented by set bits in the message bit array, according to the bit value convention used herein) is typically smaller than the total number of neighbor nodes represented in a bit indexed forwarding table, use of this alternative approach can be computationally efficient.

The tables of FIGS. 5A through 5E, along with any other tables described herein, are intended to illustrate certain kinds of data being provided without limiting the format or arrangement of such data. For example, values shown subtending multiple rows of certain tables, such as bit position or router ID values in tables 500, 510 and 520, may be implemented as multiple instances of each value, one in each row. As another example, bit positions of reachable receivers in a forwarding table such as table 540 may in some embodiments be encoded as one or more separate bit position numbers rather than with bit values in a bit array. Conversely, bit positions in a disposition table such as table 420 of FIG. 4C may in some embodiments be represented as set bits within a bit array, for use in bitwise comparison to a packet bit array. Tables as described herein may have data arranged in multiple different ways, and may take the form of a database or some other data structure. Multiple tables for a single node may in an alternative embodiment take the form of portions of a single table. Single tables described herein may in alternate embodiments be split into more than one data structure. "Table" as used herein may refer to a relevant portion of a table or other data structure, or to a collection of multiple tables or data structures holding related data. Embodiments of the tables described herein may also include other data not expressly shown, such as interface information or other information that may typically be stored at network nodes.

An example of packet flow through network 400 is illustrated in FIGS. 6A and 6B. Although controller 418 has been omitted from FIGS. 6A and 6B for clarity, network 400 is the same in FIGS. 6A and 6B as in FIG. 4A, and includes imposition information, disposition information, routing tables and forwarding tables as described above in connection with FIGS. 4B through 4F and 5A through 5E. As described in connection with FIG. 4A, an SDI signal from video source VS1 is converted to IP packets, including packet 416, by transceiver 403. In a similar manner to that shown in FIG. 2B above, icons representing messages, such as incoming packet 416, are superimposed onto the diagram of network 400, along with arrows to show direction of travel. The icons represent snapshots taken at successive times as the message (or replicas of the message) moves through the network in the direction of the arrows.

Upon receiving IP packet 416, ingress node B accesses source address 51 in the packet, then uses imposition information such as imposition table 420 of FIG. 4C to determine that packet 416 is to be encapsulated to indicate as intended destinations the receivers assigned BIER bit positions 1, 3 and 4. In an embodiment, the BIER encapsulation includes a packet bit array having set bits at bit positions 1, 3 and 4. The encapsulation may take various specific forms, as described above in the discussion of FIG. 2B. In an embodiment, an MPLS encapsulation scheme is used in which the BIER packet bit array may be up to 256 bits long. The BIER encapsulation may in some embodiments include other BIER-related information in addition to the packet bit array. Such other BIER-related information may include, for example, a flow value for use in selecting between equal-cost paths represented in a bit indexed forwarding table or a set identifier used to identify which of multiple "sets" of bit positions the bit positions of the packet bit array correspond to. Set identifiers are used in certain BIER implementations to allow a greater number of receivers or destination nodes than can be accommodated by the number of bit positions in the packet bit array being used in the network. Entries of a BIER imposition table such as table 420 may include such other BIER-related information in certain embodiments.

As a result of the encapsulation performed at ingress node B of BIER fabric 415, a BIER-encapsulated packet carrying a bit array reflecting destination bit positions 1, 3 and 4 is formed. This packet is not illustrated in FIG. 6A because in the embodiment of FIG. 6A the encapsulated packet is modified before it is forwarded away from ingress node B. Using the notation of FIG. 2B, and again using four-bit packet bit arrays for illustration, the initial BIER-encapsulated packet can be represented as P{1101}. A forwarding engine at node B then processes the encapsulated packet. The replica packets forwarded from node B as a result are illustrated in FIG. 6A, while subsequent progress of replica packets through network 400 is shown in FIG. 6B.

As part of the BIER forwarding process at node B, it is determined that an intended destination of the BIER-encapsulated packet is locally-connected receiver R5 (because of the set bit in bit position 4). Node B therefore creates a replica of packet 416 without BIER encapsulation, setting the destination address to the IP address retrieved from its disposition table 430 (shown in FIG. 4D). The resulting replica packet 602 is sent by IP unicast to receiver R5. The forwarding process at node B also determines that one or more additional intended destinations of the BIER-encapsulated packet are reachable via neighbor node A. In an embodiment, this determination is made using a bit indexed forwarding table at node B. A BIER-encapsulated replica packet 604 is forwarded from node B to node A. The bit array in packet 604 has been altered to reset the bit at bit position 4, to prevent duplication of packets to receiver R5 (via forwarding from node A back to node B). In the embodiment of FIG. 6A, spine node A is chosen by node B for BIER forwarding of packet 604. As noted above, node B could be chosen as an ECMP alternative.

Continued forwarding through BIER fabric 415 after the arrival of packet 604 at node A is shown in FIG. 6B. Using a bit indexed forwarding table such as table 540 of FIG. 5E, a BIER forwarding engine at node A determines that intended receivers are reachable via node C and node D. Replica packet 606, having its bit array modified so that only bit position 3 has a set bit, is forwarded to node C. Replica packet 608, having its bit array modified so that only bit position 1 has a set bit, is forwarded to node D. At node C, disposition table 440 is used in removing the BIER encapsulation from packet 606 and writing the IP address of receiver R4 into the destination field of resulting packet 610. At node D, two replica IP packets are created, each carrying one of the two IP addresses mapped to bit position 1 in disposition table 450. In the example illustrated by FIGS. 6A and 6B, BIER replication fabric 415 is used to replicate incoming IP packet 416 to receivers R1, R2, R4 and R5 without the use of IP multicast protocols, and without the input loading that would result from requiring transceiver 403 to replicate packets for all of these receivers. Switching the destination of a video stream to a different set of receivers can be done by reprogramming of the imposition information at ingress node B, so that a different BIER bit array is applied to the IP packets. This reprogramming can be done at a frame boundary in the transmitted video.

BIER replication fabric 415 is just one example of how a BIER replication fabric can be configured. As noted above, a BIER replication fabric can be implemented using a network not employing a leaf-spine topology. Moreover, BIER fabrics implemented using a leaf-spine topology may in some embodiments be configured differently than BIER replication fabric 415. For example, in an embodiment an ingress leaf node of a leaf-spine implementation is configured to apply BIER encapsulation according to its imposition information and forward the encapsulated packet to a spine node for forwarding, rather than performing BIER forwarding at the leaf node. In such an embodiment, leaf nodes can be configured without BIER forwarding tables, leaving this function to the spine nodes.

Figure 6C:
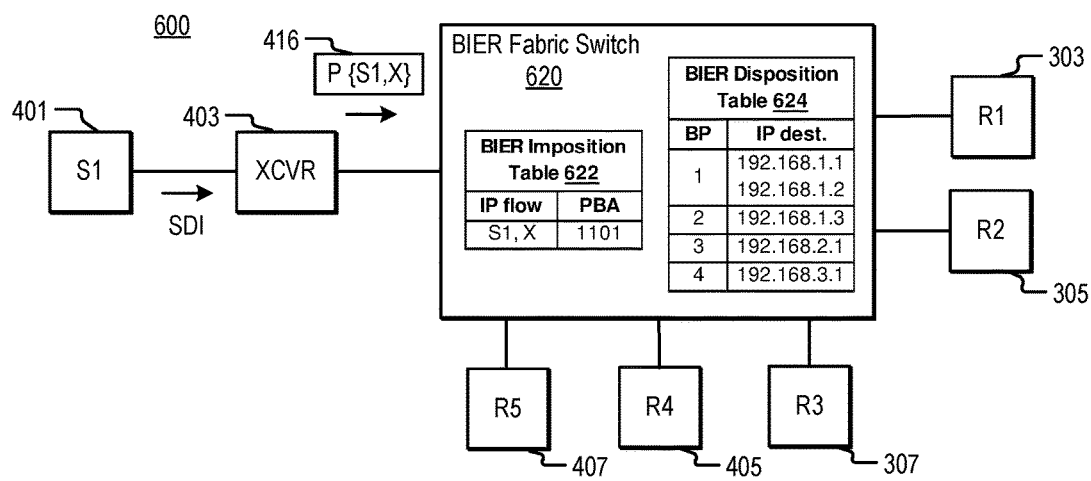
FIG. 6C is a simplified block diagram illustrating certain components of an example network including a single-switch embodiment of a BIER fabric.

As noted above in connection with FIG. 3A, a BIER fabric can in certain embodiments be implemented using a single switch. An example of a single-switch embodiment of a BIER replication fabric is illustrated in FIG. 6C. Network 600 of FIG. 6C employs the same source and receiver configuration as network 400, except that the BIER fabric is implemented using a single BIER fabric switch 620. Stored at switch 620 is imposition information in the form of BIER imposition table 622 and disposition information in the form of BIER disposition table 624. In the embodiment of switch 620, imposition table 622 includes the same information as imposition table 420 of FIG. 4C. Disposition table 624 includes a combination of the information in disposition tables 430, 440 and 450 of FIGS. 4D, 4E and 4F. Switch 620 performs both ingress and egress functions of a BIER replication fabric. Upon receiving an IP packet such as packet 416, switch 620 uses imposition table 622 to determine which bit positions represent intended receivers for the packet. Disposition table 624 is then used to obtain the destination addresses to be used in sending replica packets to the intended receivers by IP unicast. Switch 620 replicates packet 416 as needed, writes the appropriate destination IP address to each replica, and sends the replica IP packets to their respective destinations.

An embodiment of a method of encapsulating an IP packet for forwarding through a BIER replication fabric is illustrated by the flowchart of FIG. 7. In an embodiment, method 700 of FIG. 7 is performed by an ingress node of a network implementing a BIER replication fabric. Alternatively, method 700 may be performed by a switch implementing a single-switch embodiment of a BIER fabric. In yet another embodiment, method 700 is performed by a video source, transmitter or transceiver having BIER encapsulation capability. Method 700 begins in step 702 with generating or receiving of an IP packet. In general, generating of the IP packet is performed in embodiments for which method 700 is performed by a video source, transmitter or transceiver. Receiving of the IP packet is generally performed in embodiments for which the method is performed by a node or switch in the BIER replication fabric. The method continues with obtaining a BIER packet bit array for the packet from stored imposition information (step 704). In an embodiment, the imposition information is in the form of a BIER imposition table such as tables 320, 420 and 622 described above. Obtaining the packet bit array includes accessing either the source or destination address, or both, of the IP packet being encapsulated, because the packet bit array is mapped in the disposition information to the source and/or destination address.

Method 700 continues in step 706 with encapsulation of the IP packet with the BIER packet bit array. As discussed above in connection with FIG. 2B, the encapsulation of the BIER packet bit array can be done in various ways that will be understood by one of ordinary skill in the art in view of this disclosure, including, for example, through extension of an existing encapsulation such as MPLS or IPv6 or through a dedicated BIER encapsulation. In addition to the packet bit array, the encapsulation of step 706 may also incorporate other BIER-related information as described herein into the packet. The encapsulated packet is then sent to a BIER forwarding engine. The forwarding engine may be implemented at the same network device performing method 700, or at a different network device.

An embodiment of a BIER forwarding method is illustrated by the flowchart of FIG. 8. In an embodiment, method 800 of FIG. 8 is carried out by a forwarding engine at a BIER-enabled node or network device. Method 800 begins in step 802 with receiving a BIER message comprising a message bit array. In an embodiment, the BIER message is received from a network device performing a BIER encapsulation method such as method 700 of FIG. 7. In a further embodiment, a single network device, such as an ingress node to a BIER replication fabric, performs both an encapsulation method such as method 700 and a BIER forwarding method such as method 800.

Method 800 continues with accessing of a forwarding table entry corresponding to a bit position of an intended destination node for the received message (step 804). Accessing of this forwarding table entry can be done in different ways, depending upon the variation of the BIER forwarding process that is used. As noted elsewhere in this disclosure, in embodiments using a forwarding table having one entry per neighbor node (such as the tables shown in FIG. 2B), a forwarding table entry corresponding to an intended destination is found by comparing the message bit array carried by the message with the neighbor bit array in each forwarding table entry. Alternatively, in an embodiment using a forwarding table having a separate entry for each bit position represented in a neighbor bit array (such as table 540 of FIG. 5E), the forwarding table entry can be accessed by first determining the position of a set bit in the message bit array (i.e., a bit position of an intended egress or destination node) and then checking for a forwarding table entry corresponding to that bit position. In either case, the method continues by forwarding, to a neighbor node identified in the forwarding table entry, a copy of the message including a forwarded message bit array (step 806). The forwarded message bit array is in some embodiments a modified version of the incoming message bit array from the received message. If there are additional intended destinations (receivers) that have not had message replicas forwarded to them yet (decision step 808), a new forwarding table entry is accessed and the replication/forwarding is repeated until there are no remaining destinations.

The flowchart of FIG. 8B describes a more detailed sub-method for an embodiment in which the bit indexed forwarding table is sorted by bit position, in a manner similar to that of table 540 in FIG. 5E. In an embodiment, sub-method 820 of FIG. 8B can replace steps 804 through 808 of the more general method 800 in FIG. 8A. Sub-method 820 begins with accessing a forwarding table entry corresponding to the bit position of a set bit in the message bit array (step 822). A copy of the message including a forwarded message bit array is then forwarded to the neighboring node identified in the accessed table entry (step 824). As described above in connection with, for example, replicas 606 and 608 of FIG. 6B, the forwarded message bit array in some embodiments includes set bits only in bit positions of intended destinations that are reachable from the neighbor the message copy is being forwarded to.

Method 820 continues with creation of a comparison message bit array to be used in the next forwarding table entry selection (step 826). In methods using a forwarding table sorted by bit position, such as table 540 in FIG. 5E, there is a potential for duplication of packets in cases where multiple forwarding table entries identify the same neighbor node. This potential can be seen by examination of table 540, which includes two entries having node D as the neighbor node: the entry for bit position 1 and the entry for bit position 2. If an incoming message has a message bit array with set bits in both bit positions 1 and 2, sub-method 820 may proceed by detecting the set bit in bit position 1, selecting the forwarding table entry corresponding to bit position 1, and forwarding a replica to neighbor D, where the forwarded replica also has set bits in bit positions 1 and 2. Once this replica reaches neighbor D, it will be decapsulated and replicated to send IP packet replicas to receivers R1, R1 and R3, pursuant to its BIER disposition table 450. As method 920 continues, if the set bit in bit position 2 of the incoming message bit array is then detected, and the forwarding table entry for bit position 2 accessed for forwarding, an additional replica will be forwarded to node D, and again replicated to receivers R1, R2 and R3. It is therefore important to account for the fact that the message forwarded using the entry for bit position 1 carried a message bit array with a set bit for bit position 2 as well. In the embodiment of FIG. 8B, this is done by creating a comparison message bit array (in step 826) in which the destinations of the just-sent message are removed as intended destinations in the comparison message bit array. In the case of the example described above with the entry for bit position 1 in table 540, a comparison message bit array would be created having zeros in both bit positions 1 and 2 after forwarding of a replica having a message bit array with ones in those bit positions.

The comparison message bit array created in step 826 (and typically stored in a suitable set of memory locations such as a register or buffer) is then used when determining in step 828 whether any bits in the message bit array are still set. If so, the forwarding table entry selection and replica forwarding is repeated ("yes" branch of decision step 828) until no set bits remain. The comparison message bit array is also used as the starting point for any modifications to form a forwarded message bit array for a subsequent forwarded message. In an alternative to creation of a comparison message bit array, the intended destinations of a just-sent message can be accounted for in another way, such as by setting a bit in a scratch buffer (or other suitable location) for each bit position that a forwarded packet has already been directed to. In such an embodiment sub-method 820 could be modified, when checking for set bits in the incoming message bit array, to also make sure that the bit position of a set bit was not also set in the scratch buffer before accessing a forwarding table entry for that bit position.

Figure 9:
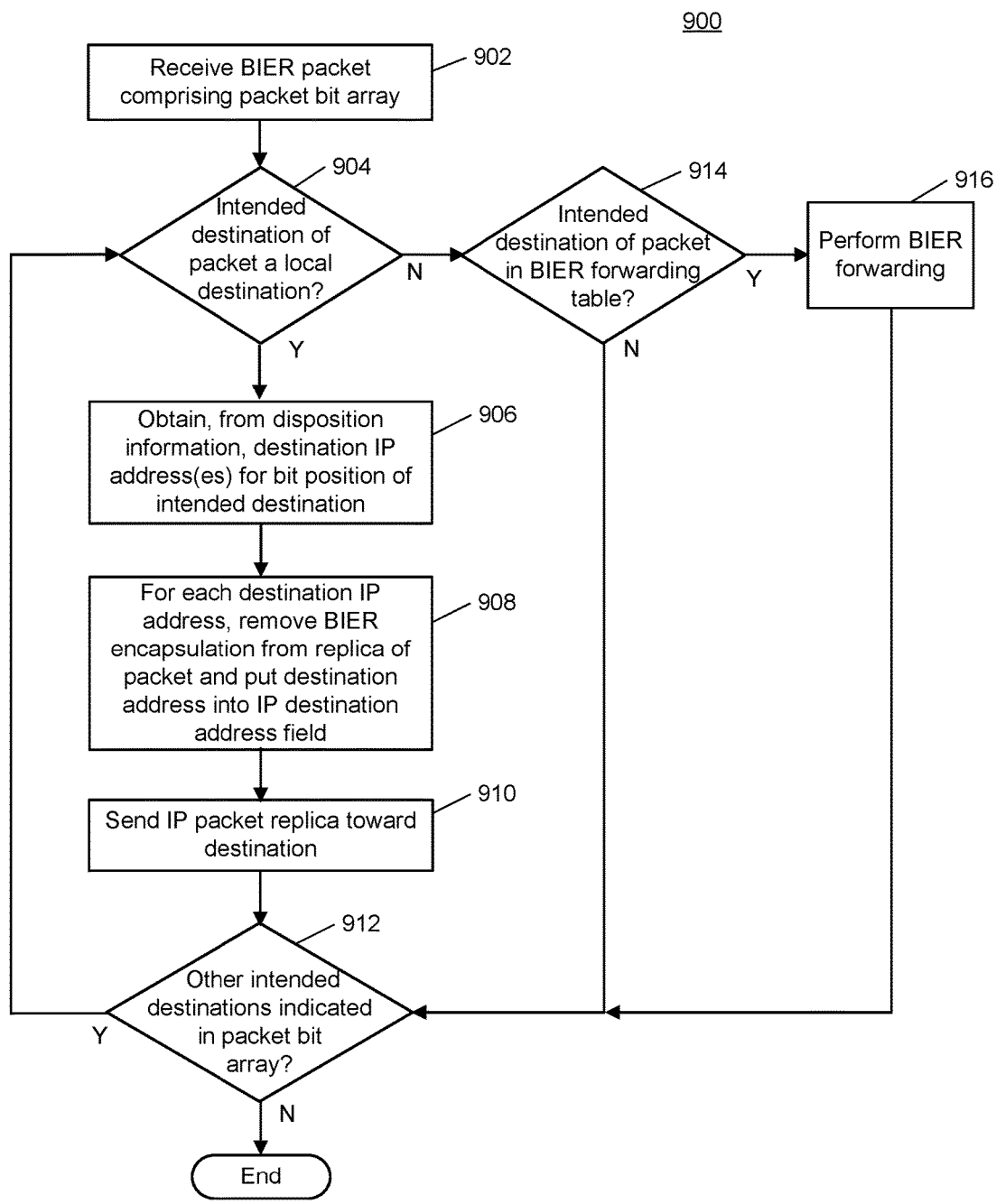
FIG. 9 is a flow chart illustrating an example of a method performed at a node of a network described herein.

An embodiment of another method for handling a packet within a BIER distribution fabric is illustrated by the flowchart of FIG. 9. In an embodiment, method 900 of FIG. 9 is carried out by an egress node of a network implementing a BIER fabric. Alternatively, method 900 may be performed by a switch implementing a single-switch embodiment of a BIER fabric. Method 900 begins in step 902 with receiving a BIER packet comprising a packet bit array. In an embodiment, the BIER packet is received from a node within a network implementing a BIER replication fabric. If an intended destination of the BIER packet is a local destination with respect to the device performing method 900 ("yes" branch of decision step 904), the method continues with obtaining, from stored disposition information, one or more destination IP addresses corresponding to the bit position of the intended destination (step 906). In an embodiment, a destination is an intended destination for the packet if the packet bit array carried by the packet has a set bit at the bit position assigned to the destination. For each IP address obtained, a copy or replica of the received packet without BIER encapsulation is made, and the IP address is written to the IP destination address field of the replica packet (step 908). The replica IP packet is sent to the destination corresponding to the destination address using IP unicast (step 910). If the packet bit array reflects other intended destinations ("yes" branch of decision step 912), the method returns to step 904 to determine whether another intended destination is a local destination, in which case steps 906 through 910 are repeated.

If an intended destination for the received BIER packet is not a local destination ("no" branch of decision step 904), but the destination is represented in a bit indexed forwarding table for the device performing method 900 ("yes" branch of decision step 914), a BIER forwarding process is performed (step 916). Examples of BIER forwarding processes that can be performed in step 916 are discussed above in connection with FIGS. 8A and 8B. Specifically, step 916 of FIG. 9 can be replaced, in an embodiment, with steps 804 and 806 of FIG. 8A or steps 822, 824 and 826 of FIG. 8B. (The function of decision step 808 of FIG. 8A or 828 of FIG. 8B is performed by decision step 912 of FIG. 9.) Method of 900 is suitable for being performed by an egress node of a network implementing a BIER fabric, where the egress node is also capable of BIER forwarding. In certain embodiments of a BIER fabric implemented with a leaf-spine network, leaf nodes may be configured as ingress and/or egress nodes without being configured for BIER forwarding within the network. A method performed by a leaf node in such an embodiment would not include steps 914 and 916 of FIG. 9. In such a method, a leaf node can, in one embodiment, ignore any intended destinations of a received packet that are not local destinations to the leaf node. Alternatively, an intended destination that is not a local destination may result in a replica being sent to a spine node for BIER forwarding.

Figure 10:
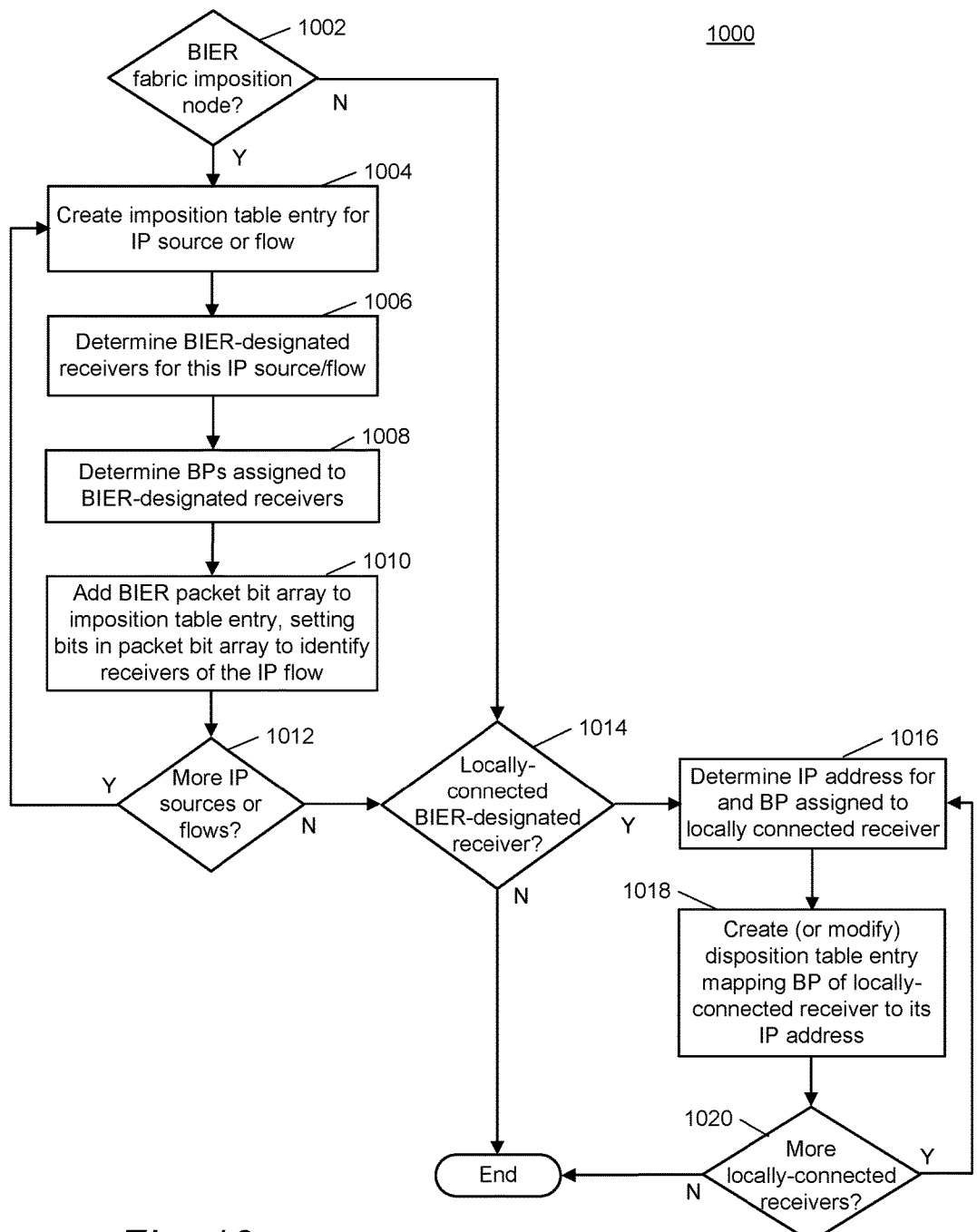
FIG. 10 is a flow chart illustrating an example of a method performed at a node of a network described herein.

An embodiment of a method for configuring a node in a BIER replication fabric is illustrated by the flow chart of FIG. 10. In an embodiment, method 1000 of FIG. 10 is performed by the network device implementing the node, with input from a network controller such as controller 418 of FIG. 4A. In another embodiment, method 1000 is performed by a network controller in communication with the node. In yet another embodiment, the method is performed by some combination of the node and a controller. Method 1000 begins with determining, at step 1002, whether the node is an imposition node, or ingress node, for the BIER fabric. Node B in network 400 discussed above is an example of an ingress node. A switch implementing a single-switch embodiment of a BIER fabric can also be considered an imposition node. If the node is an imposition node ("yes" branch of decision step 1002), the method continues with creating an imposition table entry for an IP source or flow (step 1004). In an embodiment, an IP source address is sufficient to identify a flow in a PMN, by identifying a camera. In other embodiments, an IP destination address or combination of source and destination addresses is used to identify the flow.

Method 1000 continues with determining BIER-designated receivers for the IP source or flow (step 1006). In an embodiment, the receivers for a flow are determined by a network controller. In an embodiment in which method 1000 is performed by a network device implementing the node, determining the receivers comprises receiving identification of the receivers from a network controller. The method continues in step 1008 with determining the BIER bit positions assigned to the receivers of the IP flow that have assigned bit positions (BIER-designated receivers). In an embodiment, the bit positions are determined from advertisements sent between nodes of the BIER fabric, or from nodes of the BIER fabric to a network controller. In a further embodiment, the bit positions are determined from IGP advertisements having BIER extensions. Using the bit positions, a BIER packet bit array is added to the imposition table entry, with bits set in the packet bit array in such a way as to identify the receivers of the IP flow (step 1010). In an embodiment, the bits in the packet bit array at bit positions assigned to the receivers of the IP flow are set (given a "1" value), while other bits in the packet bit array are reset (given a "0" value). If there are additional IP sources or flows that may enter the BIER fabric at the node being configured ("yes" branch of decision step 1012), the method returns to step 1004 to create a new imposition table entry.

If the node being configured is not an imposition node ("no" branch of decision step 1002), or when imposition table entries have been added for all IP flows ("no" branch of decision step 1012), it is determined whether the node being configured has a locally-connected BIER-designated receiver (decision step 1014). In an embodiment, this determination is made with reference to a bit indexed routing table at the node being configured. If there is a locally-connected receiver having an assigned BIER bit position ("yes" branch of step 1014), the method continues with determining an IP address and bit position for the locally connected receiver (1016). In an embodiment, the IP address of the receiver is determined with reference to a unicast IP routing table at the node being configured. In a further embodiment, the bit position assigned to the receiver is determined by a network controller. In a still further embodiment in which method 1000 is performed by a network device implementing the node, determining a bit position of the receiver comprises receiving identification of the bit position from a network controller. Method 1000 continues with creating or modifying a disposition table entry mapping the bit position of the locally connected receiver to its IP address (step 1018). If there are additional locally-connected receivers for the node being configured ("yes" branch of decision step 1020), the method returns to step 1016 to create (or update) another disposition table entry.

Figure 11C:
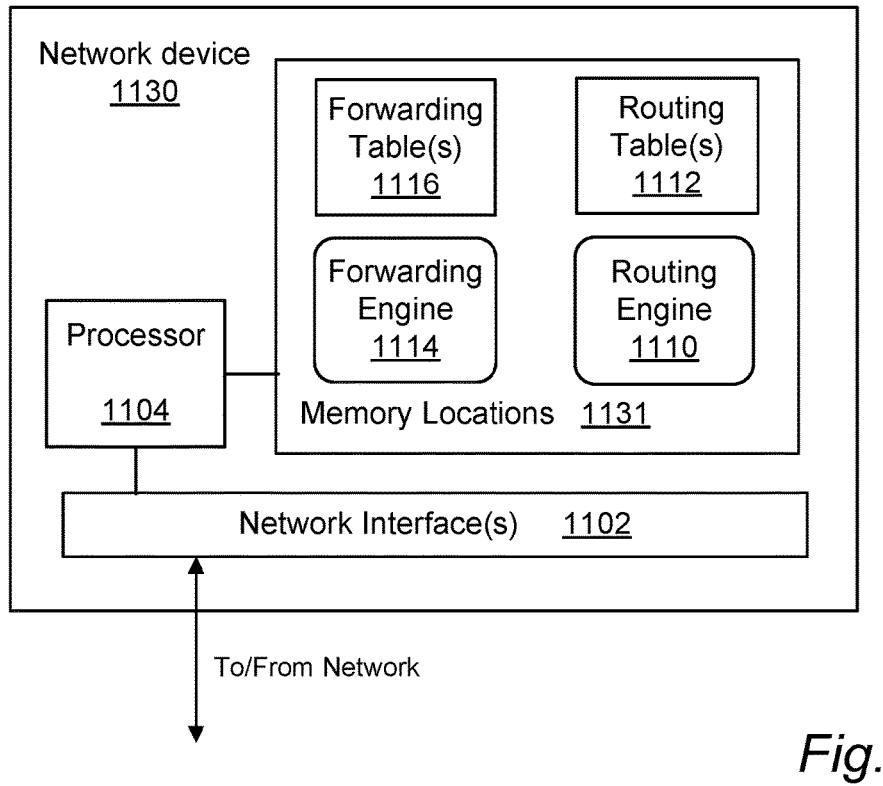
FIGS. 11A-11C are simplified block diagrams illustrating embodiments of example network devices that may be employed in the networks described herein.
Figure 11A:
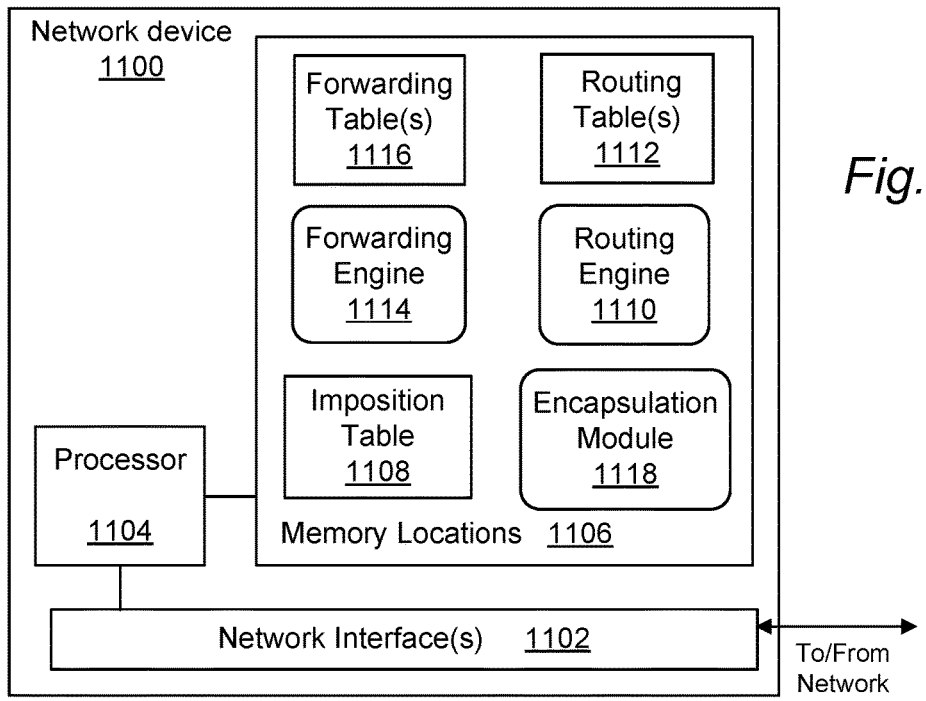
Figure 11B:
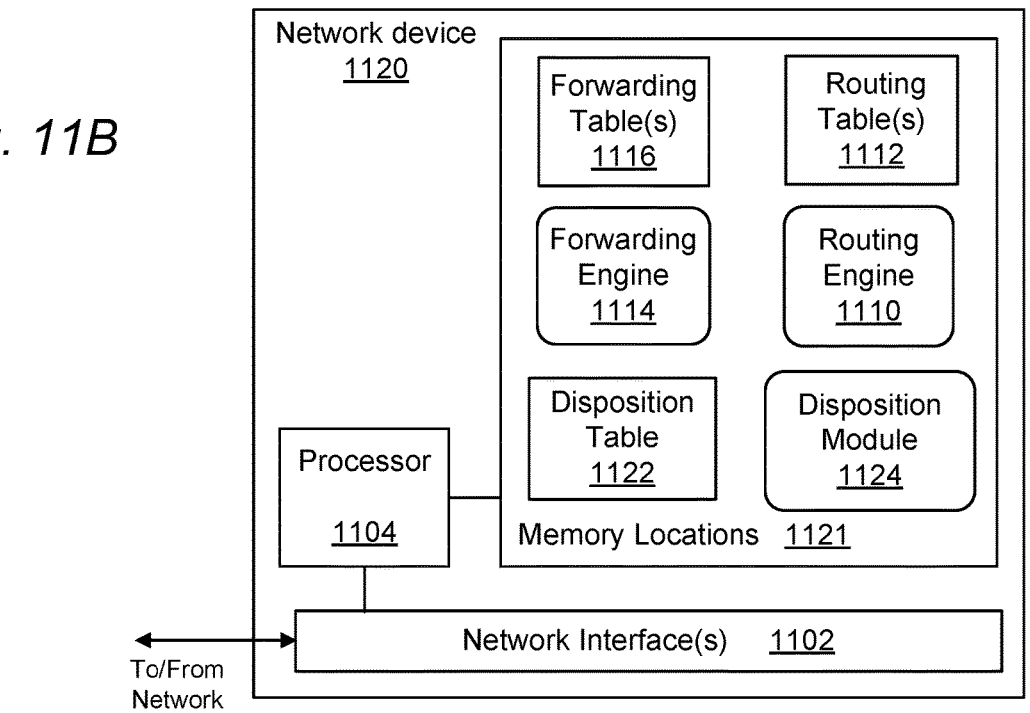

Simplified block diagrams illustrating certain embodiments of network devices that may be used with one or more of the networks described herein are shown in FIGS. 11A through 11C. In an embodiment, network device 1100 of FIG. 11A comprises an ingress node for a BIER replication fabric as described herein. Network device 1100 includes one or more network interfaces 1102, a processor 1104 and a collection of memory locations 1106. Memory locations 1106 store an imposition table 1108, routing engine 1110, one or more routing tables 1112, a forwarding engine 1114, one or more forwarding tables 1116 and an encapsulation module 1118.

Network interface 1102 is configured for both sending and receiving both messages and control information, such as IGP advertisements, within a network. In an embodiment, network interface 1102 comprises multiple interfaces and can accommodate multiple communications protocols and control protocols, including those for communication between network nodes or between a network node and a network controller. Each interface may be a physical interface or a logical interface. Memory locations 1106 include a plurality of storage locations addressable by processor 1104 for storing software programs and data structures associated with the methods described herein. As such, memory locations 1106 may be implemented using any combination of built-in volatile or non-volatile memory, including random-access memory (RAM) and read-only memory (ROM) and integrated or peripheral storage devices such as magnetic disks, optical disks, solid state drives or flash drives.

In the embodiment of FIG. 11A, memory locations 1106 store encapsulation module 1118. Encapsulation module 1118 includes computer executable instructions that when executed by processor 1104 are operable to perform operations such as receiving or generating an IP packet, obtaining a BIER packet bit array from stored imposition information, encapsulating the IP packet with the BIER packet bit array, and forwarding the encapsulated packet to a BIER forwarding engine. In the embodiment of FIG. 11A, encapsulation module 1118 uses imposition table 1108 in obtaining a BIER packet bit array. In an embodiment, imposition table 1108 is populated by, or in communication with, a network controller. Tables 320 of FIG. 3B, 420 of FIG. 4C and 622 of FIG. 6C are examples of imposition tables.

Memory locations 1106 of FIG. 11A also store a forwarding engine 1114 and routing engine 1110. Forwarding engine 1114 includes computer executable instructions that when executed by processor 1104 are operable to perform operations associated with forwarding of received messages. In an embodiment, forwarding engine 1114 performs BIER forwarding operations using a BIER forwarding table included in forwarding tables 1116. In such an embodiment, operations performed by forwarding engine 1114 include, for example, accessing a message bit array of a received BIER message, accessing an entry in a BIER forwarding table corresponding to a bit position of an intended destination node for the message, and sending a message copy with a forwarded message bit array to the neighbor node in the accessed forwarding table entry. Routing engine 1110 includes computer executable instructions that when executed by processor 1104 are operable to perform operations such as receiving network topology information via communications such as IGP advertisements or network controller communications, generating a bit indexed routing table 1112 reflecting network topology, router identifiers, and bit positions, and generating a bit indexed forwarding table 1116 from the routing table. In an embodiment, routing engine 1110 is also configured to generate non-BIER routing and forwarding tables, such as, for example, IP or MPLS/IP routing and forwarding tables or information bases.

Certain components of an embodiment of another network device are illustrated by the simplified block diagram of FIG. 11B. In an embodiment, network device 1120 of FIG. 11B comprises an egress node for a BIER replication fabric as described herein. In addition to network interface 1102 and processor 1104 as described above for network device 1100, network device 1120 includes a collection of memory locations 1121 storing a disposition module 1124 and disposition table 1122, along with forwarding engine 1114, forwarding tables 1116, routing engine 1110 and routing tables 1112 as described above for network device 1100. Memory locations 1121 are similar to memory locations 1106 described above in connection with network device 1100, except for differences in the modules and data stored.

Disposition module 1124 includes computer executable instructions that when executed by processor 1104 are operable to perform operations such as determining whether an intended destination of a BIER packet is a local destination, obtaining from stored disposition information one or more destination IP addresses corresponding to a BIER bit position assigned to the local destination, removing BIER encapsulation from a replica of the packet and writing the obtained destination IP address to the IP destination address field of the packet replica, and sending the IP packet replica toward the local destination via IP unicast. In the embodiment of FIG. 11B, disposition module 1124 uses disposition table 1122 in obtaining destination IP address(es) for the local intended destination. In an embodiment, disposition table 1122 is populated by, or in communication with, a network controller. Tables 330 of FIG. 3C, 430 of FIG. 4D, 440 of FIG. 4E, 450 of FIG. 4F and 624 of FIG. 6C are examples of disposition tables. Forwarding engine 1114 and routing engine 1110 as stored in memory locations 1121 are configured to provide for sending of packets by unicast IP to addresses obtained by disposition module 1124. In an embodiment, forwarding engine 1114 and routing engine 1110 are also configured for BIER forwarding operations as described above in connection with network device 1100.

Certain components of an embodiment of still another example of a network device are illustrated by the simplified block diagram of FIG. 11C. In an embodiment, network device 1130 of FIG. 11C comprises a forwarding node within a BIER replication fabric as described herein. In addition to network interface 1102 and processor 1104 as described above for network device 1100, network device 1130 includes a collection of memory locations 1131. Memory locations 1131 store forwarding engine 1114, forwarding tables 1116, routing engine 1110 and routing tables 1112 as described above for network device 1100. Network device 1130 may be used to implement nodes within a BIER replication fabric used for BIER forwarding, but not acting as ingress or egress nodes to the BIER fabric. Examples of such nodes include spine nodes A and E in the leaf-spine BIER fabric implementation of network 400 described herein.

Certain examples of network device configurations are illustrated in FIGS. 11A through 11C. Multiple alternatives and variations to these examples will be apparent to one of ordinary skill in the art in view of this disclosure. For example, an embodiment of a network device implementing a node acting as both an ingress and an egress node to a BIER fabric (such as node B of network 400 described herein, or switch 620 of network 600) may include a collection of memory locations storing a disposition module and disposition table, as shown in FIG. 11B, as well as an encapsulation module and imposition table, as shown in FIG. 11A. As another example, a leaf node in a leaf-spine implementation of a BIER fabric may in some embodiments not store forwarding and routing engines configured for BIER forwarding. In some embodiments, the functions of processor 1104 in devices 1100, 1120 and/or 1130 may be implemented using a combination of multiple processors. Moreover, embodiments of a network device contemplated herein may include additional components not shown. For example, network devices associated with nodes in a BIER replication fabric be adapted to use approaches and protocols not involving BIER in addition to using BIER. Such a network device may be adapted to use, for example, IP routing or MPLS with LDP in addition to BIER. Software modules and engines described herein may take various forms understood to one of ordinary skill in the art in view of this disclosure. A single module or engine described herein may in some embodiments be implemented by a combination of multiple files or programs. Alternatively or in addition, one or more functions associated with modules or engines delineated separately herein may be combined into a single file or program.

Figure 12:
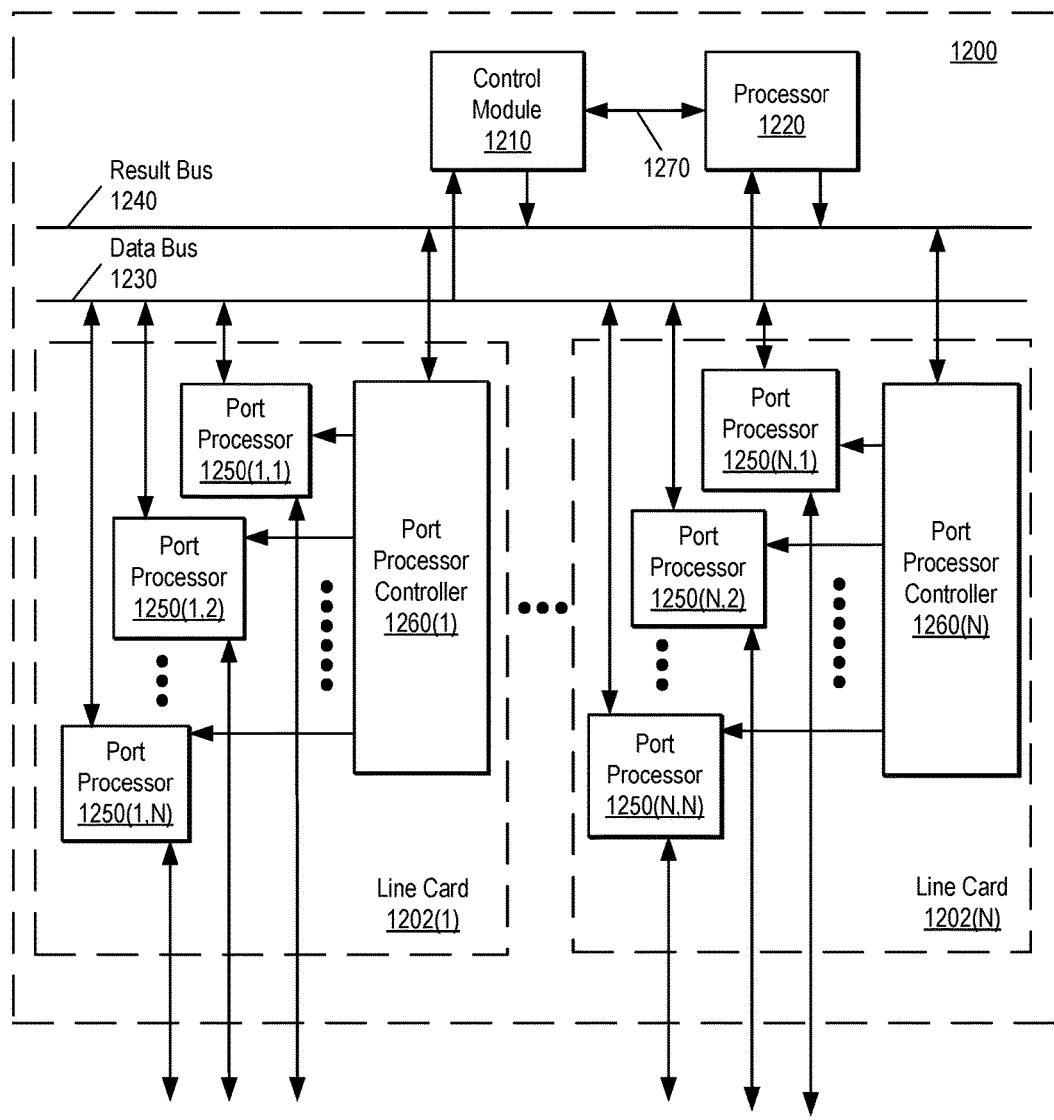
FIG. 12 is a simplified block diagram illustrating certain components of an example network device that may be employed in the networks described herein.

FIG. 12 is a block diagram providing an additional illustration of a network device that may act as, or be associated with, a node in one of the networks described herein. FIG. 12 depicts (at least in part) one configuration of a network device or a network routing element (e.g., a hub, router, switch, or similar device) 1200. In this depiction, network device 1200 includes a number of line cards (line cards 1202(1)-1202(N)) that are communicatively coupled to a control module 1210 and route processor 1220 via a data bus 1230 and result bus 1240. In an embodiment, line cards 1202(1)-1202(N), along with data bus 1230 and result bus 1240, form at least a portion of a network interface such as network interface(s) 1102 of FIGS. 11A-11C. Control module 1210 may in an embodiment include engines, modules and data structures such as forwarding engine 1114, routing engine 1110, encapsulation module 1118, forwarding table(s) 1116 and routing table(s) 1112 of FIGS. 11A-11C. Line cards 1202(1)-(N) include a number of port processors 1250(1, 1)-(N, N) which are controlled by port processor controllers 1260(1)-(N). Control module 1210 and processor 1220 are not only coupled to one another via data bus 1230 and result bus 1240, but are also communicatively coupled to one another by a communications link 1270. It is noted that in alternative embodiments, each line card can include its own forwarding engine.

When a message (e.g., a packet) is received at network device 1200, the message may be identified and analyzed in the following manner. Upon receipt, a message (or some or all of its control information) is sent from the one of port processors 1250(1, 1)-(N, N) at which the message was received to one or more of those devices coupled to data bus 1230 (e.g., others of port processors 1250(1, 1)-(N, N), control module 1210 and/or route processor 1220). Handling of the message can be determined, for example, by control module 1210. For example, a forwarding engine within control module 1210 may determine that the message is to be forwarded to one or more of port processors 1250(1, 1)-(N, N). This can be accomplished by indicating to corresponding one(s) of port processor controllers 1260(1)-(N) that the copy of the message held in the given one(s) of port processors 1250(1,1)-(N,N) is to be forwarded to the appropriate one of port processors 1250(1,1)-(N,N). Network devices described herein, such as network devices 1100, 1120, 1130 and 1200, include one or more processors such as processor 1104 and route processor 1220, which may take the form of, for example, microprocessors, PLDs (Programmable Logic Devices), or ASICs (Application Specific Integrated Circuits). These processors are configured to execute program instructions stored in computer readable storage media of various types, including RAM (Random Access Memory), ROM (Read Only Memory), Flash memory, MEMS (Micro Electro-Mechanical Systems) memory, and the like.

Figure 13:
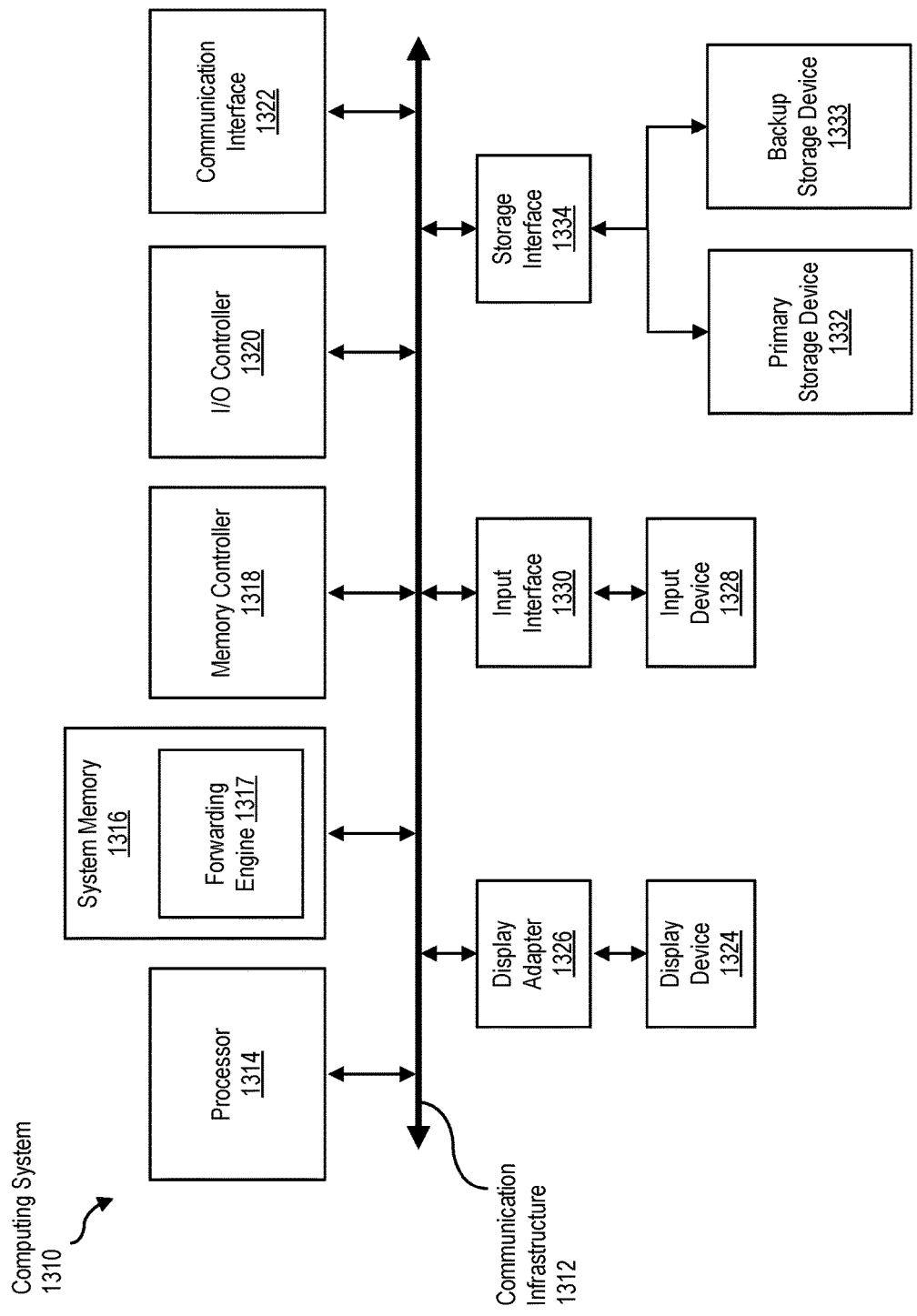
FIG. 13 is a simplified block diagram depicting a computer system suitable for implementing embodiments of the devices and systems described herein.

FIG. 13 depicts a block diagram of a computing system 1310 suitable for implementing aspects of the systems described herein. In the embodiment of FIG. 13, computing system 1310 implements a forwarding engine 1317. Embodiments of the computing system of FIG. 13 can, alternatively or in addition, implement various other engines and modules described in this disclosure. Computing system 1310 broadly represents any single or multi-processor computing device or system capable of executing computer-readable instructions. Examples of computing system 1310 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1310 may include at least one processor 1314 and a system memory 1316. By executing the software that implements a forwarding engine 1317, computing system 1310 becomes a special purpose computing device that is configured to perform message forwarding in manners described elsewhere in this disclosure.

Processor 1314 generally represents any type or form of processing unit capable of processing data or interpreting and executing instructions. In certain embodiments, processor 1314 may receive instructions from a software application or module. These instructions may cause processor 1314 to perform the functions of one or more of the embodiments described and/or illustrated herein. System memory 1316 generally represents any type or form of volatile or non-volatile storage device or medium capable of storing data and/or other computer-readable instructions. Examples of system memory 1316 include, without limitation, random access memory (RAM), read only memory (ROM), flash memory, or any other suitable memory device. The ROM or flash memory can contain, among other code, the Basic Input-Output System (BIOS) which controls basic hardware operation such as the interaction with peripheral components. Although not required, in certain embodiments computing system 1310 may include both a volatile memory unit (such as, for example, system memory 1316) and a non-volatile storage device (such as, for example, primary storage device 1332, as described further below). In one example, program instructions executable to implement a forwarding engine configured to forward messages using bit indexed explicit replication (BIER) may be loaded into system memory 1316.

In certain embodiments, computing system 1310 may also include one or more components or elements in addition to processor 1314 and system memory 1316. For example, as illustrated in FIG. 13, computing system 1310 may include a memory controller 1318, an Input/Output (I/O) controller 1320, and a communication interface 1322, each of which may be interconnected via a communication infrastructure 1312. Communication infrastructure 1312 generally represents any type or form of infrastructure capable of facilitating communication between one or more components of a computing device. Examples of communication infrastructure 1312 include, without limitation, a communication bus (such as an Industry Standard Architecture (ISA), Peripheral Component Interconnect (PCI), PCI express (PCIe), or similar bus) and a network.

Memory controller 1318 generally represents any type or form of device capable of handling memory or data or controlling communication between one or more components of computing system 1310. For example, in certain embodiments memory controller 1318 may control communication between processor 1314, system memory 1316, and I/O controller 1320 via communication infrastructure 1312. In certain embodiments, memory controller 1318 may perform and/or be a means for performing, either alone or in combination with other elements, one or more of the operations or features described and/or illustrated herein. I/O controller 1320 generally represents any type or form of module capable of coordinating and/or controlling the input and output functions of a computing device. For example, in certain embodiments I/O controller 1320 may control or facilitate transfer of data between one or more elements of computing system 1310, such as processor 1314, system memory 1316, communication interface 1322, display adapter 1326, input interface 1330, and storage interface 1334.

Communication interface 1322 broadly represents any type or form of communication device or adapter capable of facilitating communication between computing system 1310 and one or more additional devices. For example, in certain embodiments communication interface 1322 may facilitate communication between computing system 1310 and a private or public network including additional computing systems. Examples of communication interface 1322 include, without limitation, a wired network interface (such as a network interface card), a wireless network interface (such as a wireless network interface card), a modem, and any other suitable interface. In at least one embodiment, communication interface 1322 may provide a direct connection to a remote server via a direct link to a network, such as the Internet. Communication interface 1322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1322 may also represent a host adapter configured to facilitate communication between computing system 1310 and one or more additional network or storage devices via an external bus or communications channel Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like. Communication interface 1322 may also allow computing system 1310 to engage in distributed or remote computing. For example, communication interface 1322 may receive instructions from a remote device or send instructions to a remote device for execution.

As illustrated in FIG. 13, computing system 1310 may also include at least one display device 1324 coupled to communication infrastructure 1312 via a display adapter 1326. Display device 1324 generally represents any type or form of device capable of visually displaying information forwarded by display adapter 1326. Similarly, display adapter 1326 generally represents any type or form of device configured to forward graphics, text, and other data from communication infrastructure 1312 (or from a frame buffer) for display on display device 1324. Computing system 1310 may also include at least one input device 1328 coupled to communication infrastructure 1312 via an input interface 1330. Input device 1328 generally represents any type or form of input device capable of providing input, either computer or human generated, to computing system 1310. Examples of input device 1328 include, without limitation, a keyboard, a pointing device, a speech recognition device, or any other input device.

As illustrated in FIG. 13, computing system 1310 may also include a primary storage device 1332 and a backup storage device 1333 coupled to communication infrastructure 1312 via a storage interface 1334. Storage devices 1332 and 1333 generally represent any type or form of storage device or medium capable of storing data and/or other computer-readable instructions. For example, storage devices 1332 and 1333 may include a magnetic disk drive (e.g., a so-called hard drive), a floppy disk drive, a magnetic tape drive, an optical disk drive, a flash drive, or the like. Storage interface 1334 generally represents any type or form of interface or device for transferring data between storage devices 1332 and 1333 and other components of computing system 1310. A storage device like primary storage device 1332 can store information such as routing tables and forwarding tables.

In certain embodiments, storage devices 1332 and 1333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1332 and 1333 may also include other similar structures or devices for allowing computer software, data, or other computer-readable instructions to be loaded into computing system 1310. For example, storage devices 1332 and 1333 may be configured to read and write software, data, or other computer-readable information. Storage devices 1332 and 1333 may be a part of computing system 1310 or may in some embodiments be separate devices accessed through other interface systems. Many other devices or subsystems may be connected to computing system 1310. Conversely, all of the components and devices illustrated in FIG. 13 need not be present to practice the embodiments described and/or illustrated herein. The devices and subsystems referenced above may also be interconnected in different ways from that shown in FIG. 13.

Computing system 1310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1310 for storage in memory via a network such as the Internet or upon a carrier medium. The computer-readable medium containing the computer program may be loaded into computing system 1310. All or a portion of the computer program stored on the computer-readable medium may then be stored in system memory 1316 and/or various portions of storage devices 1332 and 1333. When executed by processor 1314, a computer program loaded into computing system 1310 may cause processor 1314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1310 may be configured as an application specific integrated circuit (ASIC) adapted to implement one or more of the embodiments disclosed herein.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

Although the present disclosure includes several embodiments, the disclosure is not intended to be limited to the specific forms set forth herein. On the contrary, it is intended to cover such alternatives, modifications, and equivalents as can be reasonably included within the scope defined by the appended claims.

What is claimed is:

1. A method, comprising:
   encapsulating an Internet Protocol (IP) packet with a packet bit array; and
   based on one or more bit values within the packet bit array, forwarding the encapsulated packet toward multiple intended receivers via a replication fabric within a network, wherein
   the packet bit array is configured for bit indexed explicit replication (BIER) forwarding by BIER-enabled nodes,
   each receiver of a plurality of receivers reachable via the replication fabric is represented by a relative bit position in the packet bit array carried by the encapsulated packet,
   a respective IP address is assigned to each receiver of the plurality of receivers,
   the receivers in the plurality of receivers are not BIER-enabled,
   the replication fabric is configured to store a disposition data structure mapping a relative bit position representing one or more of the plurality of receivers to the IP addresses assigned to the one or more of the plurality of receivers, and
   the replication fabric is configured to remove the packet bit array from the IP packet,
      obtain from the disposition data structure the respective IP addresses assigned to the intended receivers, and
      forward a replica of the IP packet, without a packet bit array, to each of the multiple intended receivers using the obtained respective IP address.

2. The method of claim 1, wherein encapsulating the IP packet comprises accessing imposition information mapping an IP address associated with the IP packet to a packet bit array for attaching to the IP packet.

3. The method of claim 1, wherein the disposition data structure maps a single relative bit position to multiple IP addresses assigned to the one or more of the plurality of receivers.

4. The method of claim 1, wherein the replication fabric comprises a group of interconnected nodes in the network.

5. The method of claim 4, wherein encapsulating the unicast IP packet is performed at an ingress node within the group of interconnected nodes.

6. The method of claim 4, wherein the group of interconnected nodes comprises nodes arranged in a leaf-spine topology.

7. The method of claim 6, wherein forwarding the encapsulated packet via the replication fabric comprises forwarding the packet to a spine switch.

8. The method of claim 4, wherein an egress node within the group of interconnected nodes is configured to store at least a portion of the disposition data structure.

9. The method of claim 8, further comprising:
receiving from the egress node one or more advertisements associating the egress node with one or more relative bit positions mapped by the disposition data structure at the egress node; and
incorporating the relative bit positions received in the one or more advertisements into a bit indexed routing table.

10. The method of claim 1, wherein the disposition data structure comprises a bit position column configured to store relative bit positions and an IP address column configured to store IP addresses mapped to the relative bit positions.

11. An apparatus, comprising:
a network interface; and
a processor operably coupled to the network interface and adapted to encapsulate an Internet Protocol (IP) packet with a packet bit array, and
based on one or more bit values within the packet bit array, forward the encapsulated packet toward multiple intended receivers via a replication fabric within a network, wherein
the packet bit array is configured for bit indexed explicit replication (BIER) forwarding by BIER-enabled nodes,
each receiver of a plurality of receivers reachable via the replication fabric is represented by a relative bit position in the packet bit array carried by the encapsulated packet,
the receivers in the plurality of receivers are not BIER-enabled,
a respective IP address is assigned to each receiver of the plurality of receivers,
the replication fabric is configured to store a disposition data structure mapping a relative bit position representing one or more of the plurality of receivers to the IP addresses assigned to the one or more of the plurality of receivers, and
the replication fabric is configured to remove the packet bit array from the IP packet,
obtain from the disposition data structure the respective IP addresses assigned to the intended receivers, and
forward a replica of the IP packet, without a packet bit array, to each of the multiple intended receivers using the obtained respective IP address.

12. The apparatus of claim 11, further comprising a memory operably coupled to the processor, wherein the memory is adapted to store imposition information mapping an IP address associated with the IP packet to a packet bit array for attaching to the IP packet.

13. The apparatus of claim 11, wherein the replication fabric comprises a group of interconnected nodes in the network.

14. The apparatus of claim 13, wherein the apparatus comprises an ingress node within the group of interconnected nodes.

15. The apparatus of claim 13, wherein
the apparatus is a transmitter associated with a video source, and
the processor is further configured to forward the encapsulated packet via the replication fabric by sending the encapsulated packet to an ingress node within the group of interconnected nodes.

16. The apparatus of claim 12, wherein the memory further comprises a bit indexed routing table relating one or more of the relative bit positions representing the plurality of receivers to corresponding neighbor nodes within the replication fabric.

17. The apparatus of claim 16, wherein the memory further comprises a bit indexed forwarding table relating a neighbor node within the replication fabric to relative bit positions of receivers reachable via the neighbor node.

18. The apparatus of claim 14, wherein
the group of interconnected nodes comprises nodes arranged in a leaf-spine topology, and
the ingress node comprises a leaf switch.

19. The apparatus of claim 18, wherein the processor is further adapted to forward the encapsulated packet to a spine switch within the group of interconnected nodes.

20. The apparatus of claim 19, wherein the spine switch comprises a bit indexed forwarding table relating a neighbor node within the group of interconnected nodes to relative bit positions of receivers reachable via the neighbor node.

* * * * *